(12) United States Patent
Jabara et al.

(10) Patent No.: US 10,009,638 B2
(45) Date of Patent: *Jun. 26, 2018

(54) SYSTEM AND METHOD FOR MULTI-CHANNEL WIFI VIDEO STREAMING

(71) Applicant: Mobilitie, LLC, Newport Beach, CA (US)

(72) Inventors: Gary B. Jabara, Irvine, CA (US); Lloyd Frederick Linder, Agoura Hills, CA (US); David Brett Simon, Agoura Hills, CA (US)

(73) Assignee: Mobilitie, LLC, Newport Beach, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/577,822

(22) Filed: Dec. 19, 2014

(65) Prior Publication Data

US 2015/0106855 A1 Apr. 16, 2015

Related U.S. Application Data

(60) Division of application No. 13/925,328, filed on Jun. 24, 2013, which is a continuation-in-part of
(Continued)

(51) Int. Cl.
*H04N 21/236* (2011.01)
*H04N 21/4363* (2011.01)
(Continued)

(52) U.S. Cl.
CPC ....... *H04N 21/236* (2013.01); *G06Q 30/0241* (2013.01); *H04L 65/4076* (2013.01);
(Continued)

(58) Field of Classification Search
CPC ......... H04N 21/21805; H04N 21/2187; H04N 21/41407; H04N 21/4312;
(Continued)

(56) References Cited

U.S. PATENT DOCUMENTS 5,708,961 A 1/1998 Hylton et al.
6,751,573 B1 6/2004 Shaw
(Continued)

OTHER PUBLICATIONS

International Search Report issued in international application No. PCT/US2014/027586, dated Sep. 16, 2014 (2 pages).
(Continued)

*Primary Examiner* — Benjamin R Bruckart
*Assistant Examiner* — Aklil M Tesfaye
(74) *Attorney, Agent, or Firm* — Davis Wright Tremaine LLP; Michael J. Donohue

(57) ABSTRACT

A video or multimedia distribution system receives multiple video streams and transcodes them into a single stream of UDP packets with each of the plurality of video data packets for respective ones of the video streams being assigned a port number corresponding to the respective video stream. The UDP packets are routed to a plurality of Access Points (APs) for transmission. A User Equipment (UE) communicates with the APs and selects one or more of the video streams for viewing on the UE by selecting the port number corresponding to the desired video streams. The UE can "change channels" to view other video streams by changing the port number to the port number of the desired video stream.

29 Claims, 17 Drawing Sheets

Related U.S. Application Data application No. 13/834,359, filed on Mar. 15, 2013, which is a continuation-in-part of application No. 13/363,943, filed on Feb. 1, 2012, now Pat. No. 9,179,296, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,359.

(51) Int. Cl.

| | |
|---|---|
| *H04N 21/643* | (2011.01) |
| *H04N 21/647* | (2011.01) |
| *H04N 21/482* | (2011.01) |
| *H04W 8/18* | (2009.01) |
| *H04L 29/06* | (2006.01) |
| *G06Q 30/02* | (2012.01) |
| *H04W 8/20* | (2009.01) |
| *H04W 84/18* | (2009.01) |
| *H04W 88/04* | (2009.01) |
| *H04W 4/06* | (2009.01) |
| *H04W 76/40* | (2018.01) |

(52) U.S. Cl.
CPC ........ *H04L 65/4092* (2013.01); *H04L 65/605* (2013.01); *H04N 21/43637* (2013.01); *H04N 21/482* (2013.01); *H04N 21/64322* (2013.01); *H04N 21/64707* (2013.01); *H04W 8/186* (2013.01); *H04L 69/162* (2013.01); *H04L 69/164* (2013.01); *H04W 4/06* (2013.01); *H04W 8/205* (2013.01); *H04W 76/40* (2018.02); *H04W 84/18* (2013.01); *H04W 88/04* (2013.01)

(58) Field of Classification Search
CPC ........... H04N 21/43615; H04N 21/485; H04N 21/2747; H04N 21/4223; H04N 21/43637; H04N 21/64322; H04N 21/4383; H04N 21/6175; H04N 21/41415; H04N 21/482; H04N 21/236; H04N 21/64707; H04N 7/181; H04N 21/4314; H04N 7/01; G06Q 30/0241; H04L 65/4092; H04L 65/4076; H04L 65/605; H04L 69/164; H04L 69/162; H04W 8/186; H04W 4/06; H04W 88/04; H04W 84/18; H04W 76/40; H04W 8/205
See application file for complete search history.

(56) References Cited

U.S. PATENT DOCUMENTS

| | | | |
|---|---|---|---|
| 6,839,080 B2 | 1/2005 | Meyers | |
| 7,230,917 B1 | 6/2007 | Fedorkow | |
| 7,970,351 B2 | 6/2011 | Jabara et al. | |
| 8,139,581 B1 | 3/2012 | Mraz et al. | |
| 8,190,119 B2 | 5/2012 | Jabara et al. | |
| 8,565,578 B2 | 10/2013 | Plourde, Jr. | |
| 8,752,092 B2 | 6/2014 | Weeks | |
| 8,995,923 B2 | 3/2015 | Jabara | |
| 8,998,923 B2 | 3/2015 | Jabara et al. | |
| 9,077,564 B2 | 7/2015 | Jabara et al. | |
| 9,179,296 B2 | 11/2015 | Jabara et al. | |
| 2002/0047861 A1 | 4/2002 | LaBrie et al. | |
| 2002/0077118 A1 | 6/2002 | Zellner et al. | |
| 2002/0105931 A1 | 8/2002 | Heinonen et al. | |
| 2003/0106067 A1 | 6/2003 | Hoskins et al. | |
| 2003/0159153 A1 | 8/2003 | Falvo | |
| 2003/0192055 A1* | 10/2003 | Aoki | H04N 7/17318 725/109 |
| 2004/0032495 A1 | 2/2004 | Ortiz | |
| 2004/0098745 A1 | 5/2004 | Marston et al. | |
| 2004/0250273 A1 | 12/2004 | Swix et al. | |
| 2005/0041596 A1 | 2/2005 | Yokomitsu et al. | |
| 2005/0055708 A1 | 3/2005 | Gould | |
| 2005/0152287 A1 | 7/2005 | Yokomitsu et al. | |
| 2006/0053448 A1 | 3/2006 | Reichardt | |
| 2006/0075449 A1 | 4/2006 | Jagadeesan et al. | |
| 2006/0085834 A1* | 4/2006 | Chang | H04N 7/106 725/115 |
| 2006/0161960 A1 | 7/2006 | Benoit | |
| 2006/0288375 A1 | 12/2006 | Ortiz et al. | |
| 2007/0008435 A1* | 1/2007 | Sung | H04H 20/31 348/729 |
| 2007/0055989 A1 | 3/2007 | Shanks et al. | |
| 2007/0089145 A1* | 4/2007 | Medford | H04N 21/222 725/81 |
| 2007/0094691 A1 | 4/2007 | Gazdzinski | |
| 2007/0107034 A1 | 5/2007 | Gotwals | |
| 2007/0204294 A1 | 8/2007 | Walker et al. | |
| 2007/0288978 A1 | 12/2007 | Pizzurro et al. | |
| 2008/0022352 A1 | 1/2008 | Seo | |
| 2008/0036851 A1* | 2/2008 | Patel | G06Q 20/40 348/21 |
| 2008/0060025 A1 | 3/2008 | Chen | |
| 2008/0068252 A1* | 3/2008 | Mehta | H04N 21/235 342/115 |
| 2008/0092202 A1 | 4/2008 | Greenquist et al. | |
| 2008/0104642 A1 | 5/2008 | Galipeau et al. | |
| 2008/0127257 A1 | 5/2008 | Kvache | |
| 2008/0151885 A1 | 6/2008 | Horn et al. | |
| 2008/0212583 A1 | 9/2008 | Rey | |
| 2008/0253368 A1 | 10/2008 | Rasanen | |
| 2008/0301744 A1* | 12/2008 | Hutchings | H04L 29/12066 725/110 |
| 2008/0313691 A1 | 12/2008 | Cholas et al. | |
| 2009/0041118 A1 | 2/2009 | Pavlovskaia et al. | |
| 2009/0064246 A1 | 3/2009 | Bell | |
| 2009/0077267 A1 | 3/2009 | Alrabady et al. | |
| 2009/0183217 A1* | 7/2009 | Mukerji | H04N 7/17318 725/110 |
| 2009/0199254 A1* | 8/2009 | White | H04N 7/163 725/110 |
| 2009/0217318 A1 | 8/2009 | Versteeg et al. | |
| 2009/0222854 A1 | 9/2009 | Cansler | |
| 2009/0282438 A1 | 11/2009 | White | |
| 2010/0020794 A1* | 1/2010 | Cholas | H04N 7/17318 370/389 |
| 2010/0023842 A1 | 1/2010 | Rahrer et al. | |
| 2010/0070997 A1* | 3/2010 | Friedman | G06F 1/1626 725/37 |
| 2010/0077436 A1 | 3/2010 | Barnes et al. | |
| 2010/0080163 A1 | 4/2010 | Krishnamoorthi | |
| 2010/0192183 A1* | 7/2010 | Hu | H04N 7/165 725/62 |
| 2010/0195623 A1 | 8/2010 | Narasimhan | |
| 2010/0226288 A1 | 9/2010 | Scott et al. | |
| 2010/0227554 A1 | 9/2010 | Jabara et al. | |
| 2010/0242075 A1 | 9/2010 | Vimpari et al. | |
| 2010/0293301 A1 | 11/2010 | Amini et al. | |
| 2010/0306801 A1* | 12/2010 | Filippov | H04N 5/44543 725/44 |
| 2011/0066745 A1 | 3/2011 | Olsson et al. | |
| 2011/0103374 A1 | 5/2011 | LaJoie et al. | |
| 2011/0158146 A1 | 6/2011 | Poola et al. | |
| 2012/0062800 A1 | 3/2012 | Sisto | |
| 2012/0077466 A1 | 3/2012 | O'Mahony et al. | |
| 2012/0137332 A1 | 5/2012 | Kumar | |
| 2012/0140645 A1 | 6/2012 | Bonta | |
| 2012/0144445 A1 | 6/2012 | Bonta | |
| 2012/0151075 A1 | 6/2012 | Mraz et al. | |
| 2013/0036234 A1* | 2/2013 | Pazos | H04L 12/189 709/231 |

(56) References Cited

U.S. PATENT DOCUMENTS

2013/0083843 A1   4/2013  Bennett
2014/0157325 A1   6/2014  Jabara
2014/0344847 A1  11/2014  Jabara

OTHER PUBLICATIONS

International Search Report issued in international application No. PCT/US2014/027606, dated Dec. 9, 2014 (5 pages).
International Search Report issued in international application No. PCT/US2014/027629, dated Aug. 19, 2014 (3 pages).
SONICblue, ReplayTV 5000, User Guide, 2002, 86 pages.

* cited by examiner

SYSTEM AND METHOD FOR MULTI-CHANNEL WIFI VIDEO STREAMING

RELATED APPLICATIONS

This application is a divisional of U.S. application Ser. No. 13/925,328 filed on Jun. 24, 2013, which is a continuation-in-part of U.S. application Ser. No. 13/834,359 filed on Mar. 15, 2013, now U.S. Pat. No. 9,271,054, which is a continuation-in-part of U.S. application Ser. No. 13/363,943 filed on Feb. 1, 2012, now U.S. Pat. No. 9,179,293, which is a continuation-in-part of U.S. application Ser. No. 13/093,998 filed on Apr. 26, 2011, now U.S. Pat. No. 8,995,923, which is a continuation-in-part of U.S. application Ser. No. 12/958,296 filed on Dec. 1, 2010, now U.S. Pat. No. 9,077,564, which is a continuation-in-part of U.S. application Ser. No. 12/616,958 filed on Nov. 12, 2009, now U.S. Pat. No. 8,190,119, which is a continuation-in-part of U.S. application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of video streaming of multiple video channels using wireless communication devices.

Description of the Related Art

Wireless communication networks have become commonplace. A vast array of base stations is provided by a wireless service provider to form a public mobile land network (PLMN). A number of known PLMNs are provided by different service providers and may or may not be compatible with each other depending on the particular implementation of the network. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In a typical situation, the individual wireless communication devices communicate with one or more base stations. Even when two wireless communication devices are located a few feet from each other, there is no direct communication between the wireless devices. That is, the wireless devices communicate with each other via one or more base stations and other elements of the respective PLMNs of the two wireless communication devices.

Conventional personal computers (PC) typically include one or more wireless interfaces, such as Bluetooth and WiFi, to permit the easy connection of external devices to the PC (using Bluetooth, for example) or to simplify the implementation of a home network with wireless routers (using WiFi, for example) that establish a communication link between the PC and the router to thereby provide network access. The same WiFi connections are often used on laptop PCs to gain network access (e.g., the Internet) in hotels, airports, coffee shops, and the like. As is known in the art, the user must search for an available wireless network and select one of the available networks for connection thereto. Sometimes, a password and encryption are required to connect to the selected network.

State of the art mobile communication devices typically include a network transceiver to communicate with the service provider PLMN, as described above, and one or more short-range transceivers, such as Bluetooth and WiFi. The Bluetooth transceiver is often used to establish a connection with an automobile sound system to facilitate hands-free communication with the service provider PLMN using the network transceiver. The WiFi interface in the mobile communication devices can be used to provide network access (e.g., the Internet) in the same manner described above with respect to PCs and laptop computers. That is, the user must search for an available wireless network and select one of the available networks for connection thereto.

A new family of computing devices, such as tablet computers and electronic readers, have wireless communication capability as well. In some cases, the computing devices include both network transceivers and short-range transceivers, such as those described above. As can be appreciated, the PLMN implementation typically requires a contract with a service provider. In some tablet computers and electronic readers, the network transceiver has been eliminated, thus eliminating the need for a service provider contract, but also eliminating the ability to communicate via the service provider PLMN. With this type of device, network access is available only through a short-range transceiver that communicates with an access point (AP), such as may be found in hotels, airports, coffee shops, and the like. The APs are typically implemented as wireless access points and the portable computing device must connect to the AP in the same manner described above with respect to PCs and laptop computers. That is, the user must search for an available wireless network and select one of the available networks for connection thereto.

A popular use for network access is to download video or multimedia data. As can be appreciated by those skilled in the art, a request or demand for multimedia data requires a significant amount of bandwidth. In a public setting, such as an airport, simultaneous or overlapping requests for on-demand video will cause a slowdown in the delivery of data to all devices connected to the particular AP.

Therefore, it can be appreciated that there is a need for the delivery of streaming video from APs to wireless communication devices in an effective manner without causing a slow down at the AP. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
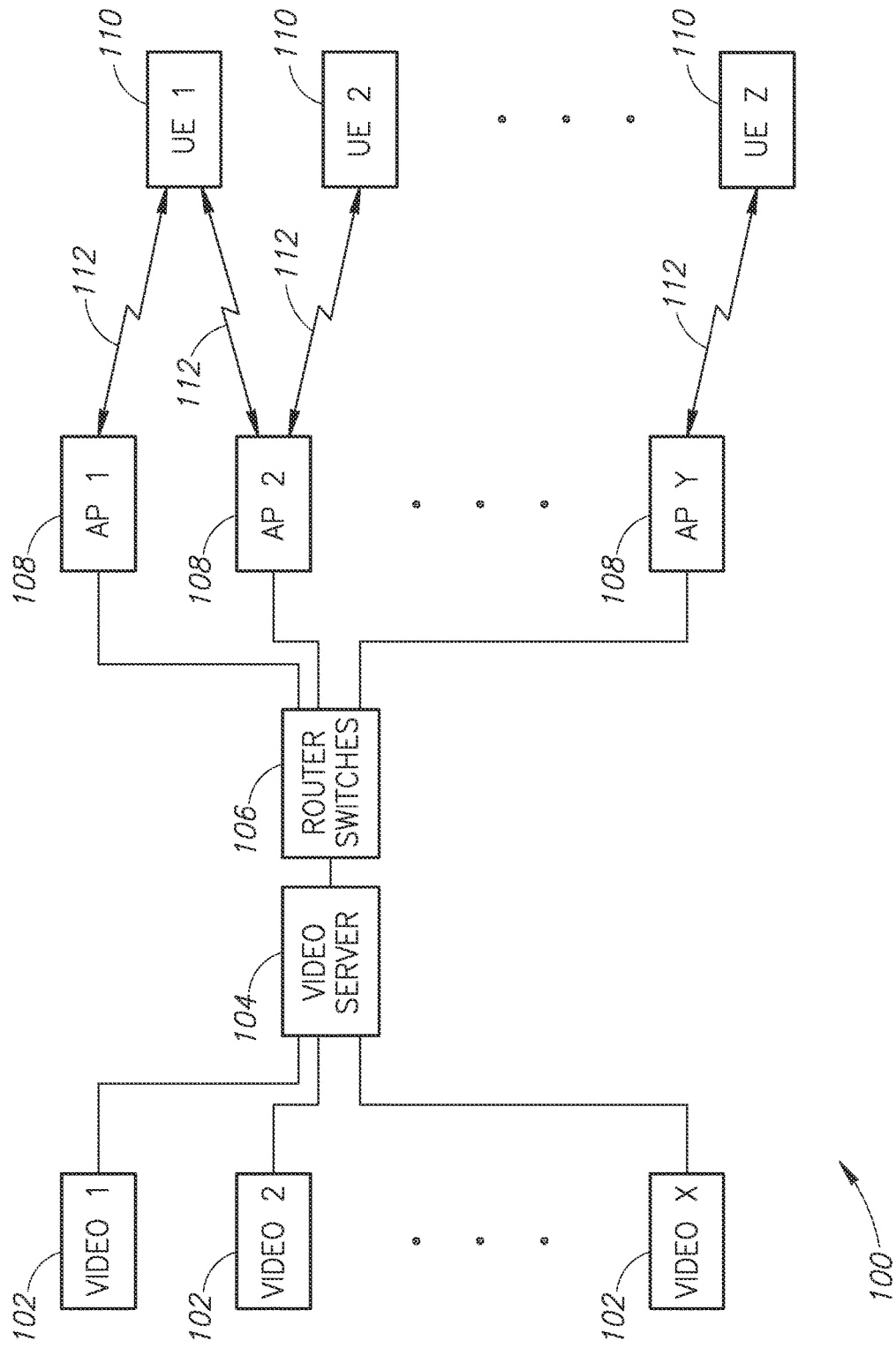
FIG. 1 is an example of network architecture of a dynamic network illustrating communication between user equipment and wireless access points.

The system described herein permits the distribution of a multiple video channels through one or more wireless access points for reception by a plurality of wireless communication devices. FIG. 1 illustrates a system 100 that illustrates an exemplary embodiment of the video distribution system. In the system 100, a plurality of video sources 102 are illustrated in FIG. 1 as VIDEO 1, VIDEO 2, VIDEO X. The video sources 102 may be live video, such as produced by a video camera, or may be remote video feeds, such as provided by a television network. Then video feed could also be an instant replay channel under control of a server.

A video server 104 is configured to receive the individual video streams from the video sources 102. The video server 104 is implemented by one or more conventional computing devices. The general operation of a server is well known in the art and need not be described herein except as related to the specific video processing.

The video server 104 processes the multiple individual video streams and creates a single stream of video data packets. In an exemplary embodiment, the video server 104 creates a single stream video data packet in accordance with a User Datagram Protocol (UDP), which is a conventional Internet communication protocol. As is known in the art, UDP is a simple transmission protocol with no handshaking and no integrated error correction capabilities. On the other hand, UDP is useful in time-sensitive applications where the error correction capabilities provided by other protocols, such as TCP, are undesirable.

UDP also provides for port numbers to be included in each UDP data packet. In accordance with the present disclosure, the video server 104 creates video data packets for each of the video streams from the video sources 102 but assigns a different port number for each of the respective video sources. For example, VIDEO 1 will be packetized into a stream of UDP packets where each of the packets corresponding to the VIDEO 1 stream has the same port number. In contrast, the VIDEO 2 is encoded into a plurality of UDP data packets, but uses a different port number than the VIDEO 1 data stream. Thus, the video server 104 encodes each video stream into a single stream of UDP packets where the UDP packets corresponding to each video stream are assigned different port numbers.

In this manner, the video server 104 creates a single stream of UDP packets where the individual packets have different port numbers that correspond to the video streams from the respective video sources 102. The stream of UDP packets are routed through an infrastructure 106 to a plurality of wireless access points (APs) 108. The particular form of the infrastructure 102 depends on the specific implementation of the system 100. However, the infrastructure 106 typically includes routers, switches, and may include a gateway. The function of the infrastructure 106 is to route the UDP video packets from the video server 104 to one or more of the APs 108. In addition, the infrastructure 106 routes data from the APs 108 to the video server 104.

In FIG. 1, the APs 108 are illustrated as AP 1, AP 2, AP Y. In an exemplary embodiment, the UDP video data packets are routed to all the APs 108 such that each AP receives the same video data packets. In an alternative embodiment, the data packets for different video sources can be routed to selected ones of the APs 108. For example, all UDP packets with a port number corresponding to the VIDEO 1 data stream can be routed only to AP 1 and AP 2. In contrast, the UDP data packets with a port number corresponding to the VIDEO 2 stream can be routed to all APs 108. Thus, the system 100 has the ability to selectively route the UDP video packets to one or more of the APs 108 under control of the video server 104. In addition, the APs 108 must be configured to broadcast UDP data frames and not block the broadcast of any UDP data frames.

FIG. 1 also illustrates a plurality of wireless communication devices, sometimes referred to as user equipment (UE) 110. The term UE is intended to include any wireless communication device capable of processing audio, video, and text messaging. This includes smart phones, that may or may not include a network transceiver for communication with a public land mobile network (PLMN), laptops, PDAs, computer tablets (e.g., an iPad™), and the like. The system 100 is not limited by the particular form of the communication device.

In FIG. 1, the UEs 110 are illustrated as UE1, UE2, . . . UE Z. As will be described in greater detail below, the UEs 110 include programming that allows the individual UEs 110 to selectively receive UDP data packets having a single selectable port number. Thus, each UE 110 can select a particular video stream for viewing on a display of the UE 110 by selecting the port number corresponding to the desired video stream. If the UE 110 has sufficient computing power, it may select more than one port number to thereby receive and process multiple video streams. For example, the UE 110 may select two port numbers and display two video screens in a side-by-side fashion much like split-screen television. In yet another embodiment, the UE 110 may select multiple port numbers and display multiple video streams with a reduced screen size. For example, the UE may display a plurality of video signals as thumbnail (or larger) video signals simultaneously on the display.

The UEs 110 may be able to establish a communication link with more than one AP 108. As illustrated in FIG. 1, UE 1 can communicate with both the AP 1 and AP 2 via respective wireless communication links 112. FIG. 1 illustrates UE 2 as coupled only to the AP 2 via wireless communication link 112 while UE Z communicates with AP Y via wireless communication link 112. Thus, the UEs 110 are in wireless communication with one or more of the APs 108.

Those skilled in the art will appreciate that the APs 108 are multicasting multiple video channels to any UE 110 within range of an AP. This multicast approach is in contrast to conventional unicast streaming. In unicast streaming, the AP 108 receives a data stream for each individual UE 110. The requirement of one video stream for each end user will quickly consume all of the available bandwidth for the AP. In contrast, the UDP multicasting in accordance with the system 100 described herein makes video streams available for an unlimited number of UEs 110 that may be connected to an AP 108. The approach overcomes the bandwidth limitations of unicast streaming. In addition, as will be described in greater detail below, the application associated with the UDP multicast streaming functions as an equivalent to a TV guide for watching different channels or video streams broadcast from the AP 108. A display on the UE 110 can be dynamically configured by the video server 104. In addition to the video streams, the video server 104 can also send out a list of channels that are being provided via the APs 108. Alternatively, as will be discussed in greater detail below, the TV guide data may be in the form of text, graphical display data, still images, such as a captured video frame, or an actual display of multiple video signals. For example, the UE 104 can display multiple thumbnail (or larger) video signals corresponding to each of the available channels. Thus, the number of video streams from different video sources 102 is limited by the bandwidth capacity of a particular AP 108. As APs 108 use improved technology, the number of video sources 102 available for multicast streaming can also increase accordingly. However, the number of available video streams is not limited by the number of UEs 110 receiving data from any particular AP 108. That is, the number of UEs 110 receiving data from a particular AP 108 is unlimited. Thus, the number of UEs 110 viewing video streams is effectively detached from the bandwidth limitation of the AP 108 itself. The system 100 permits the equivalent of broadcast television on the display 154 (see FIG. 3) as opposed to a classical television screen.

In operation, the video server 104 can receive the various video streams from the video sources 102 in different formats. However, those skilled in the art will appreciate that certain formats may simplify the process of transcoding from multiple video streams to the UDP video packets. In an exemplary embodiment, the video data is formatted in accordance with MPEG-2. If the data is multimedia data, the audio data is also formatted in accordance with MPEG standards. If the video sources 102 provide video in the MPEG-2 video format, the video server need not perform any conversion. Furthermore, there are other optimization settings that are imposed by the video server 104, or more may already be provided by the video sources 102. For example, a video frame rate of 24-30 frames per second provides a relatively smooth video display on the UE 110. In another example of optimization settings, the video server 104 may provide the video data at a rate of 64,000 bits per second (bps) to 300,000 bps. The audio signal may be sampled at approximately 32,000 bps. A video size of 320 pixels by 240 pixels or smaller is generally satisfactory for the typical display 154 (see FIG. 3) on the UE 110. As noted above, the video sources 102 may already provide the data in this format. If the video sources 102 provide video data as an analog signal, the video server 104 must process the data accordingly.

In an exemplary embodiment, the video server 104 utilizes MPEG-TS, which refers to a conventional encoding process for a transport stream. The video server 104 provides UDP broadcast streaming and uses a UDP broadcast address that is computed using the net mask and IP address. Those skilled in the art will appreciate that when a device connects to a WiFi source, such as the AP 108, it receives setting backs that include a subnet net mask, IP address, and gateway. The broadcast address is processed in a conventional manner using this data. Current APs 108 may be configured for operation in accordance with IEEE 802.11n. These devices are dual-band (i.e., 2.4 GHz and 5 GHz). In addition, many access points are designed for operation with multiple input-multiple output (MIMO) antenna configurations. Under ideal conditions, such dual-band APs 108 can generally support 10 or more video streams with each video stream requiring approximately 1 megabit per second (Mbps). Those skilled in the art will appreciate that the distance between the AP 108 and the UE 110 is a significant factor for data throughput rates. However, in a typical venue 200, such as described herein, a large number of APs 108 can be positioned to provide a high quality signal level to the UE 110.

There are presently some mobile communication devices, such as a Windows8™ product, that does not include UDP processing capability. To provide communications with these devices, the system 100 can apportion the available bandwidth of one or more of the APs 108 to permit the simultaneous broadcast of both multicast data and unicast data. One portion of the AP bandwidth is allocated for use with TCP/IP and another portion of the AP bandwidth is allocated for the UDP multicast.

To accommodate the apportionment of available AP bandwidth, the network 210 (see FIG. 8) can adjust the up/down data rates to conserve bandwidth. The data rate can be throttled to permit both unicast and multicast transmissions from a single AP 108.

Figure 18:
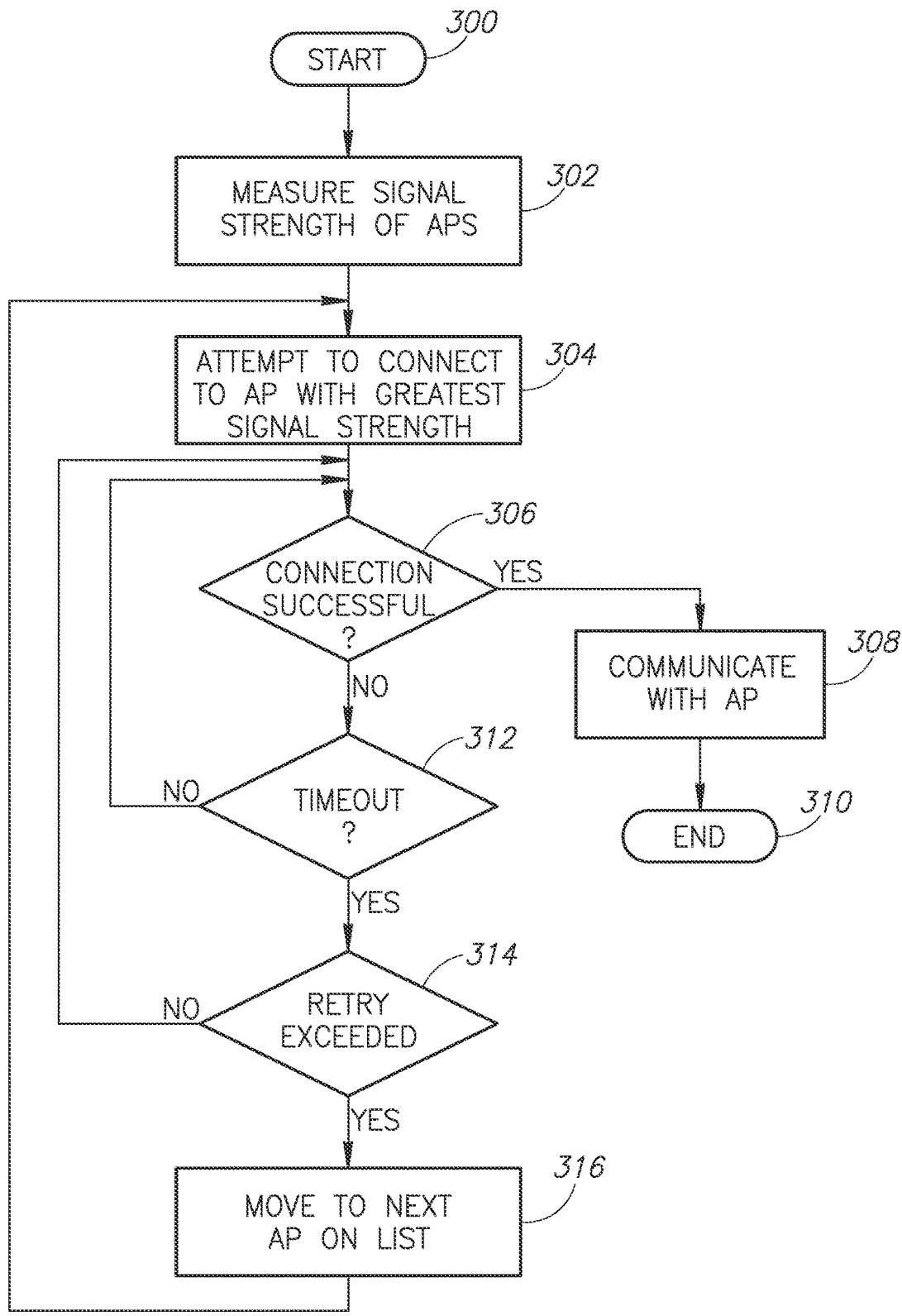
FIG. 18 is a flow chart describing an exemplary implementation of a mobile communication device finding a wireless access point with which to connect.

As described in detail herein, the use of multicast data from the AP 108 greatly increases the number of UEs 110 that can receive data therefrom. However, even in a multicast mode, there may be a limit to the number of UEs 110 that can connect to any single AP 108. In this event, the process illustrated in the flowchart of FIG. 18 can be used to select an alternate AP 108.

At a start 300, there is a network of APs 108. In step 302, a UE 110 measures the signal strength of any APs 108 that are in range of the UE 110. As is known in the art, the UE 110 selects an AP with which to communicate based on the signal strength measurements. In essence, the UE 100 creates a list of available APs 108 in order of the relative signal strength.

In step 304, the UE attempts to establish a communication link 112 with the AP 108 having the greatest signal strength. In decision 306, the UE 110 determines whether the connection has been successfully established. If the communication link 112 has been successfully established, the result of decision 306 is YES. In that event, the UE 110 communicates with the AP 108 via the established communication link 112 in step 308 and the process ends at 310.

If the communication link 112 is not successfully established, the result of decision 306 is NO. In that event, the UE 110 determines whether the attempt to establish the communication link 112 has exceeded a predetermined timeout in decision 312. If the timeout has not been exceeded, the result of decision 312 is NO, and the process returns to decision 306 to continue the attempt to establish the communication link 112 with the first AP 108 on the signal strength list. If the timeout has occurred, the result of decision 312 is YES and the UE 110 moves to decision 314 to determine whether the number of retries has been exceeded.

If the number of times to attempt to establish the communication link 112 has not been exceeded, the result of decision 314 is NO, and the process returns to decision 306 to continue the attempt to establish the communication link 112 with the first AP 108 on the signal strength list. If the number of retries has been exceeded, the result of decision 314 is YES. In that event, the UE 110 moves to the next AP 108 on the list (i.e., the AP with the second highest signal strength) in step 316. The process returns to step 304 to connect to the AP 108 with the second highest signal strength. In this manner, the UE 110 will automatically connect an available AP 108.

Figure 2:
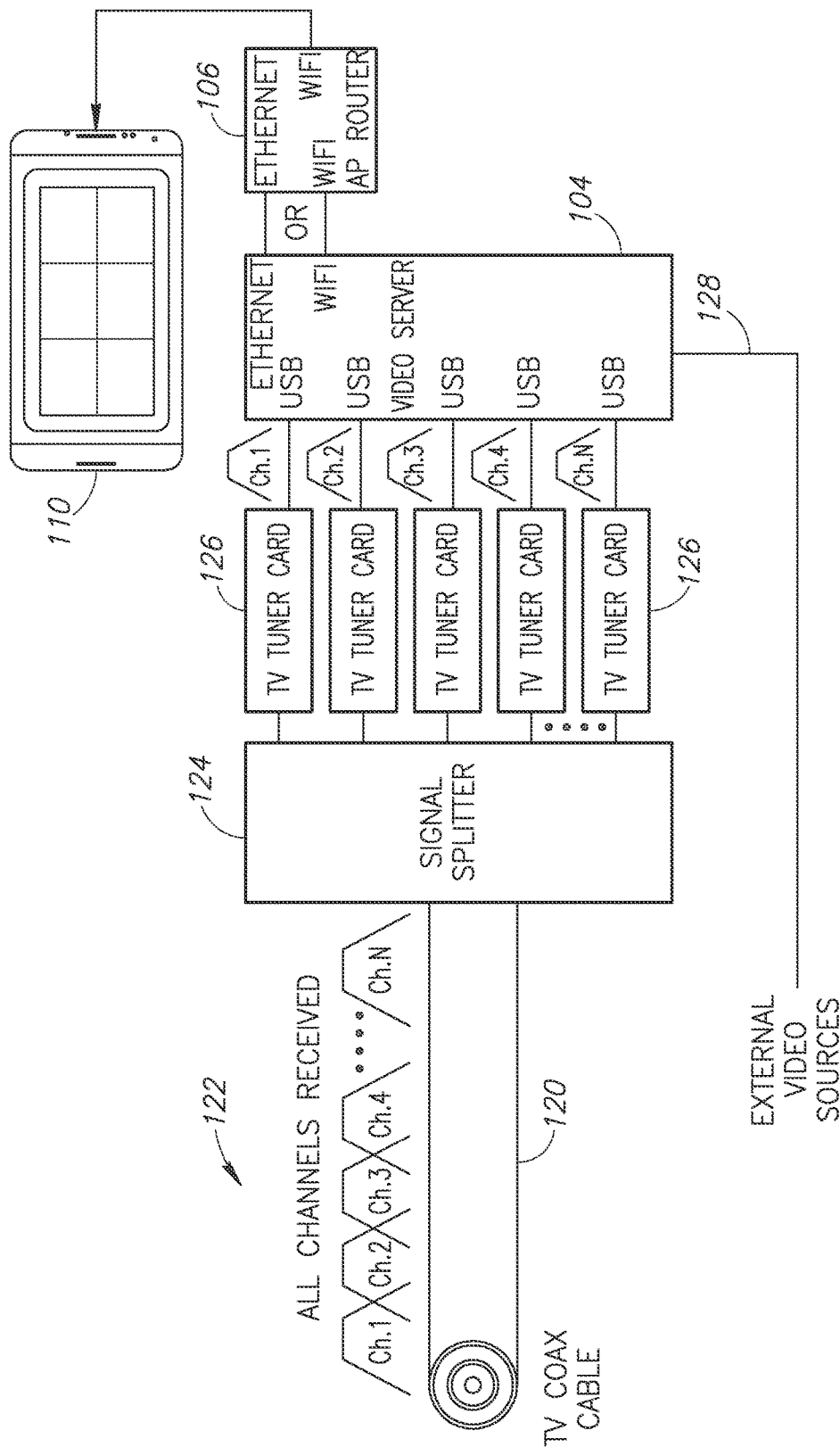
FIG. 2 is a functional block diagram of a television tuner system to provide multiple television signals to the video server of FIG. 1.

FIG. 2 is a functional block diagram of a tuner system to permit the reception and encoding of multiple television channels. FIG. 2 illustrates a coaxial cable, such as may be used to provide television signals from a cable source, a satellite source, or the like. As those skilled in the art will appreciate, the cable 120 will carry multiple channels indicated by a reference 122 that shows multiple channels labeled Ch. 1-Ch. N. The cable 120 is cabled to a signal splitter 124, which may also include a conventional amplifier. The multiple outputs of the signal splitter 124 are coupled to inputs of individual TV tuner cards 126. Although each TV tuner card 126 is illustrated as a separate circuit in FIG. 2, some circuit boards may include multiple TV tuner cards. The TV tuner cards 126 are commercial products that tune the individual channels (i.e., Channels 1-N). In an exemplary embodiment, the output of each TV tuner card 126 is a digital signal. In an exemplary embodiment, the audio and video signals may be generated by the TV tuner card 126 in accordance with known industry standards, such as MPEG 2 and MPEG 4. As is known in the art, MPEG 2 is a standard for coding of moving pictures and associated audio data. The MPEG 4 standard defines compression for audio and video digital data.

The outputs of the individual TV tuner cards 126 are coupled to corresponding inputs on the video server 104. In the embodiment illustrated in FIG. 2, the TV tuner cards 126 are implemented with a universal serial bus (USB) interface and are coupled to corresponding USB interfaces on the video server 104. Those skilled in the art will appreciate that other interfaces, such as an Ethernet interface, may also be satisfactorily employed. The system 100 is not limited by the type in interface connecting the TV tuner cards 126 with the video server 104.

In addition to the TV tuner cards 126, the video server may receive one or more external video sources 128. The external video sources may be video only or may include audio data to thereby form a multimedia data stream. The external video sources 128 are intended to represent one or more video sources. The external video sources 128 may be generated locally within a single venue, or delivered from a remote location via conventional means, such as satellite communication link, microwave, cable, or the like.

In operation, the video server 104 may include a media player, such as a VLC media player, that is configured to receive video signals in various formats, such as MPEG 2 and MPEG 4. The media player program reformats the data from each of the TV tuner cards 126 into a UDP format. The UDP data is then in a suitable format for streaming. The video server 104 assembles the individual UDP packets from the TV tuner cards 126 and any external video sources 128 and creates a single stream. As discussed above, the UDP packets are provided with port numbers that correspond to the individual channels. That is, all of the UDP packets for Ch. 1 have the same port number. In addition, all of the UDP packets for Ch. 2 have the same port number, but a different number from that assigned to the packets for Ch. 1. Thus, each UDP packet may be identified as part of a stream from the individual TV tuner cards 126 based on the unique port numbers assigned thereto. Similarly, the external video sources 128 are assigned individual port numbers corresponding to the individual ones of the external video sources.

In an embodiment described herein, the single stream of UDP data packets is routed through the router switches 106 (see FIG. 1) to the various APs 108. In an alternative embodiment, the video server 104 may generate the serial UDP data stream using an Ethernet interface. In this embodiment, the streaming video signals are routed via conventional Ethernet interface and decoded in the same manner as data packets transmitted from the APs 108.

Figure 16:
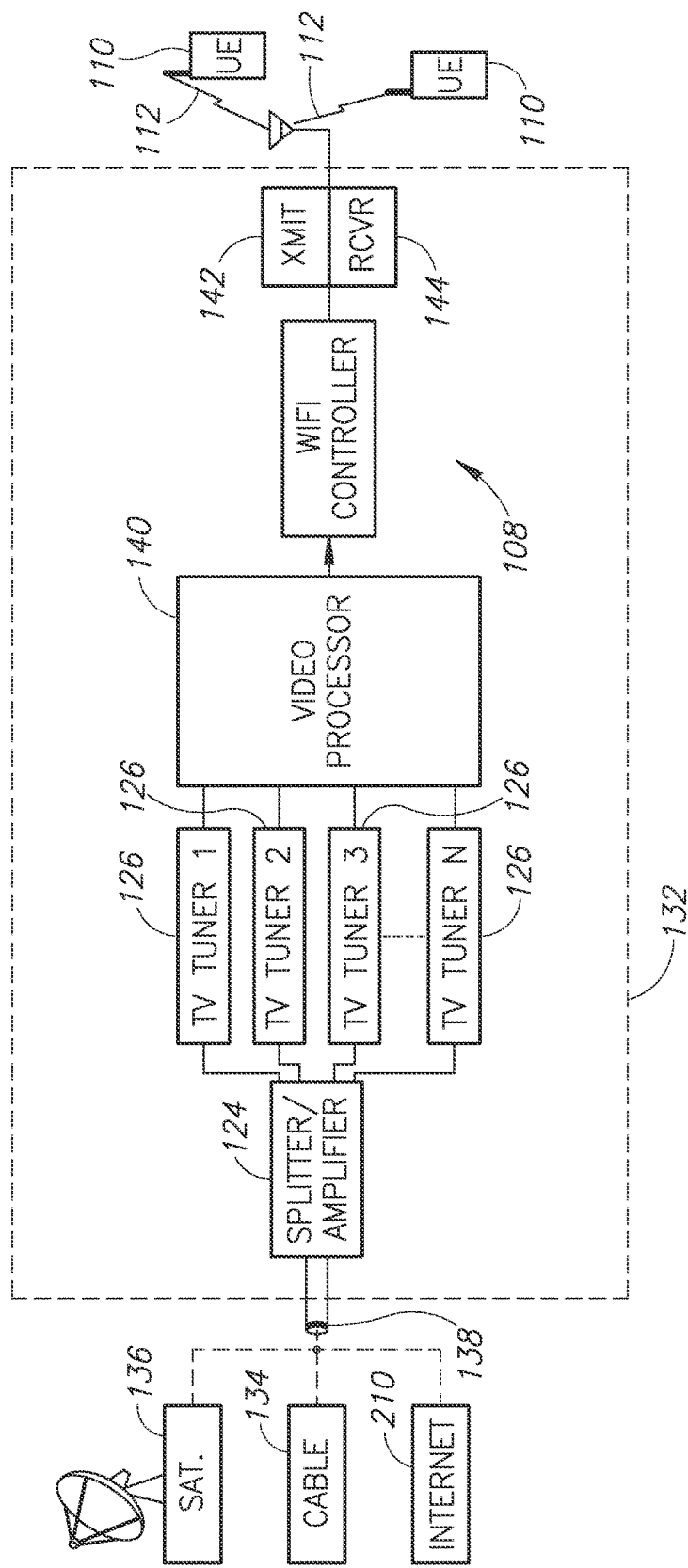
FIG. 16 is a functional block diagram of an integrated wireless access point and video server.

An integrated version 132 of the system of FIG. 2 is illustrated in FIG. 16. The device 132 in FIG. 16 is an integrated tuner and AP. The radio frequency (RF) television signals can be provided by a cable service provider 134, a satellite receiver 136, or the like. The RF signals are provided to an input connector 138, such as a cable connector. The splitter 124, which may also include a conventional amplifier, splits the single signal into multiple signals that are connected to the inputs of a plurality of TV tuner cards 126. As noted above, the TV tuner cards 126 may implemented as individual cards or may be implemented with multiple tuners on a single card. For the integrated device 132, the TV tuner cards 126 may be integrated onto a single board. The outputs of the TV tuners 126 are couple to a processor 140, which provides the functionality of the video server 104. The processor 140 may be implemented as a conventional microprocessor, a graphics processor, a digital signal processor, programmable gate array, application specific integrated circuit, or the like. The integrated device 132 is not limited by the specific implementation of the processor 140.

The integrated device 132 does not require all the functionality of the video server 104 and only communicates with a single integrated AP 108 having a transmitter 142 and receiver 144. The single AP 108 functions in the manner described above with respect to the plurality of APs 108. The AP receiver 144 can receive communications from any of the UEs 110. In one embodiment, the UEs 108 can request a particular TV channel. If none of the TV tuners 126 are tuned to that channel, the processor 140 can send instructions to one of the plurality of TV tuners to change to the requested channel. Thereafter, the processor 140 will begin receiving the video stream from the user-requested channel and encode that channel in the manner described above. Thus, the integrated system 132 can provide multiple channels and change channels on user request. This is in addition to the multiple channels already provided by the UDP stream from the AP 108.

The integrated device 132 does not require the infrastructure 106 (see FIG. 1) because the processor 140 is connected directly to the AP 108. Thus, the processor 140 need only provide the functionality of transcoding the individual data streams from the TV tuners 126 and the generation of the single UDP output stream. As described above with the video server 104, the processor 140 will assign a port number to each UDP data packet that corresponds with one of the plurality of data streams.

A power supply (not shown) makes the integrated device 132 as a self-contained device. The integrated device 132 has utility in a setting, such as a home where the integrated device 132 has an input 138, such as a cable input. The processor 140 encodes the plurality of video streams and broadcasts them throughout the home using the integrated AP 108. Conventional WiFi extenders (not shown) may be used to extend the range of the AP 108. Alternatively, a large home may include multiple ones of the integrated devices 132.

Figure 17:
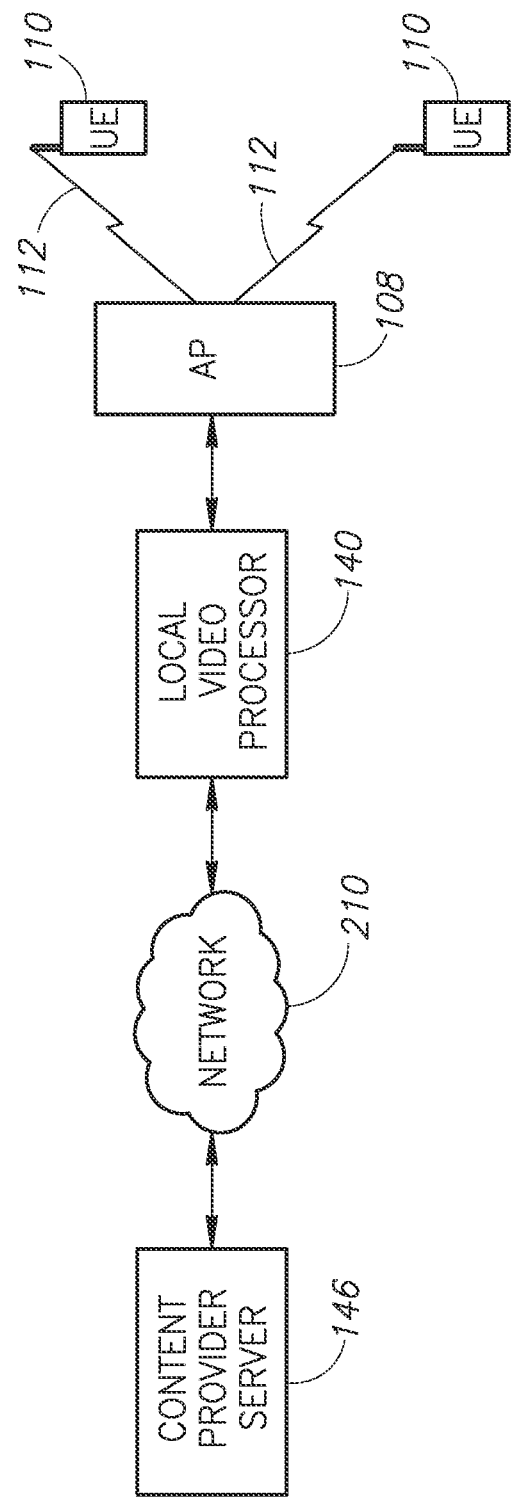
FIG. 17 is a functional block diagram of a remote video server operating in conjunction with a local video server.

Another variation of the embodiment of FIG. 16 is illustrated in FIG. 17. In this embodiment, a content provider server 146 contains a plurality of data files, such as movies, available for on-demand delivery. The content provider server 146 is remote from and coupled to a local implementation of the video server 104 (see FIG. 1) or the processor 140 (see FIG. 16) via the network 210, such as the Internet. The local processor 140 receives on-demand requests from one or more of the UEs 110 via the AP 108. While FIG. 16 illustrates only one AP 108, the embodiment of FIG. 17 can include one or more APs 108 to provide coverage over a selected area.

The local processor 140 relays the on-demand requests to the content provider server 146. A unicast connection link is established between the content provider server 146 and the local processor 140. In an exemplary embodiment, the on-demand data streams are transmitted using conventional unicast protocols, such as TCP/IP. A device, such as the VLC media player discussed above, receives the unicast data stream and transcodes the data packets into a multicast data stream. In one embodiment, the transcoding process generates a single data stream in accordance with UDP protocols. As described above with respect to other implementations, the local processor 140 assigns a different port number to the UDP packets for each of the different received data streams. The processor 140 sends the single stream of UDP packets to the AP 108 for multicast transmission in the manner described above. The AP 108 transmits the multicast data packets in the manner described above so that each UE 110 connected to the AP 108 can receive any one or more of the desired data streams.

In an exemplary embodiment, the device of FIG. 17 could be used in a home or a hotel where the local processor 140 is configured to communicate with the content provider server 146 via a unicast Internet connection. The local processor 140 transcodes the received unicast data streams and may also receive data streams from other sources, such as the TV tuner cards 126 (see FIG. 2) and/or the external video sources 128. The various sources are transcoded and turned into a single data stream for multicasting by one or more APs 108.

Figure 3:
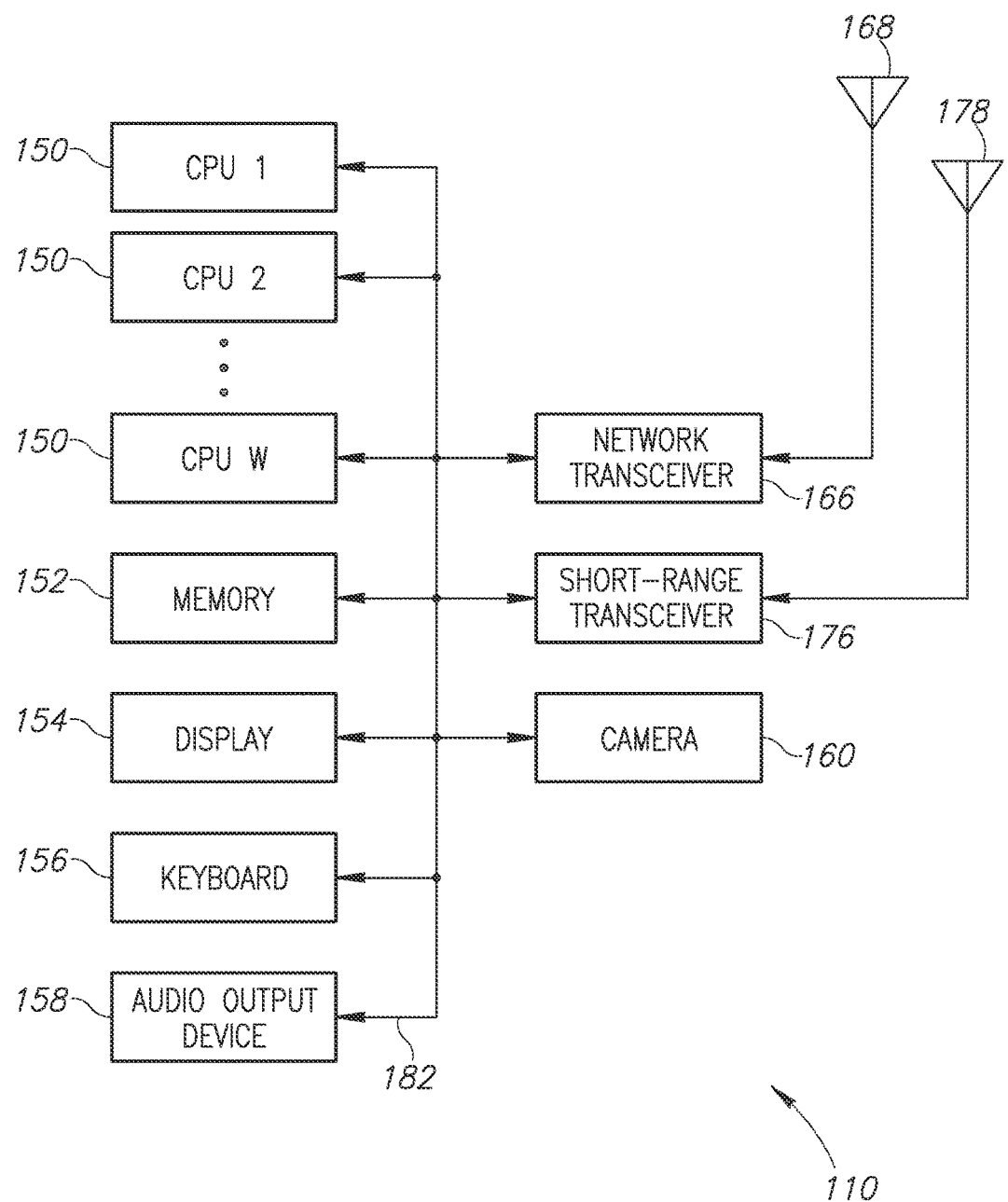
FIG. 3 is functional block diagram of one of the wireless communication devices of FIG. 1.

FIG. 3 is a functional block diagram illustrative of one of the UEs 110 illustrated in FIG. 1. The system 100 takes advantage of current implementations of the UE 110 that typically include multiple processors. As will be described in greater detail below, one processor in the UE is configured to handle communications with the AP 108 while a second processor is configured for playback of received video data. The UE 110 in FIG. 3 includes a plurality of central processing units (CPUs) 150. The CPUs 150 are illustrated in FIG. 3 as CPU 1, CPU 2, CPU W. Those skilled in the art will appreciate that the CPUs 150 may be implemented as conventional microprocessors, an application specific integrated circuit (ASIC), digital signal processor (DSP), programmable gate array (PGA), or the like. The UE 110 is not limited by the specific form of the CPUs 150.

The UE 110 in FIG. 3 also contains a memory 152. In general, the memory 152 stores instructions and data to control operation of the CPUs 150. The 5 memory 152 may include random access memory, read-only memory, programmable memory, flash memory, and the like. The UE 110 is not limited by any specific form of hardware used to implement the memory 152. The memory 152 may also be integrally formed in whole or in part with the CPUs 150.

The UE 110 of FIG. 3 also includes conventional components, such as a display 154, a keypad or keyboard 156, an audio output device 158, and camera 160. In many UEs 110, the display 154 is a touch-sensitive display that incorporates the functionality of the display 154 and the keyboard 156. These are conventional components that operate in a known manner and need not be described in greater detail. Other conventional components found in wireless communication devices, such as a USB interface, Bluetooth interface, infrared device, and the like, may also be included in the UE 110. For the sake of clarity, these conventional elements are not illustrated in the functional block diagram of FIG. 3.

In some embodiments, the UE 110 of FIG. 3 also includes a network transceiver 166 such as may be used by the UE 110 for the conventional wireless communication network with the service provider PLMN (not shown), as described above. The network transceiver 166 is connected to an antenna 168. The network transceiver 166 is illustrated as a generic transceiver. The UEs 110 may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the PLMN (not shown) is well-known in the art and need not be described in greater detail herein.

The UE 110 of FIG. 3 also includes a short-range transceiver 176 that is used by the UEs 110 to communicate with the APs 108 of FIG. 1. The short-range transceiver 176 is connected to an antenna 178. In an exemplary embodiment, the antennas 168 and 178 may have common components are implemented as a single antenna.

The various components illustrated in FIG. 3 are coupled together by a bus system 180. The bus system may include an address bus, data bus, power bus, control bus, and the like. For the sake of convenience, the various busses in FIG. 3 are illustrated as the bus system 180.

In an exemplary embodiment, the short-range transceiver 176 may be designed for operation in accordance with IEEE standard 802.11, sometimes referred to as WiFi. Most modern wireless communication devices are equipped with WiFi and may be readily upgraded to support the functionality described herein. A technique for establishing communication between the UEs 110 and the APs 108 using WiFi is described in U.S. application Ser. No. 12/397,225, filed on Mar. 3, 2009, now U.S. Pat. No. 7,970,351. Because the UEs 108 all include WiFi capability, the UEs may be designed for communication with the APs 108, regardless of the type of service provider PLMN or, indeed, in the total absence of the network transceiver 166 (see FIG. 1). Thus, the UE 110 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

Various techniques for establishing the short-range communication links 112 (see FIG. 1) are described in U.S. application Ser. No. 12/397,225 filed on Mar. 3, 2009, now U.S. Pat. No. 7,970,351, U.S. application Ser. No. 12/616, 958 filed on Nov. 12, 2009, U.S. application Ser. No. 12/958,296, filed on Dec. 1, 2010, U.S. application Ser. No. 13/093,998 filed on Apr. 26, 2011, and U.S. application Ser.

No. 13/363,943 filed on Feb. 1, 2012, the entire disclosures and content of which are hereby incorporated by reference in their entirety.

The user of a conventional wireless communication device can search for a wireless access point and connect to that access point, as is common in public areas, such as an airport terminal, coffee shop, or the like. The goal of this connection is generally to provide Internet access. However, the UEs 110 described herein can include an application program interface (API) that can be programmed into the UE at the time of manufacture or downloaded in a conventional manner. Some functionality of the API will be described herein. A more complete description of the API is provided by U.S. patent application Ser. No. 13/093,998 and titled System and Method for Management of a Dynamic Network Using Wireless Communication Devices, filed on Apr. 26, 2011 and incorporated herein by reference in its entirety. The API becomes part of the operating system in that it is always executing in the background. In this manner, the API is different from a conventional application software program that must be activated by the user. In one aspect, the API includes a "heartbeat" signal that periodically communicates with any available AP 108 and provides identification data, location data and the like to a database server 232 (see FIG. 8). In addition, the API advantageously simplifies authentication of the UE whenever it enters a venue that is part of the system described herein.

In FIG. 1, the UE 1 has established the wireless communication links 112 with the AP 1 and AP 2, respectively. As the user moves from one location to another in a particular venue, he may move in or out of range of one AP 108 or the other. Thus, the UE 110 can receive the video stream from one of the plurality of APs 108 distributed throughout the venue.

In operation, the API or a separate application program provides a set of instructions to two of the CPUs 150 to perform specific tasks. In an exemplary embodiment, a first processor (e.g., CPU 1) is programmed with native code to perform the task of capturing data packets received from the APs 108 and storing the received data packets. As used herein, the term "native code" refers to software code that has been compiled to processor-specific machine code. In the example described herein, CPU 1 is responsible for capturing all data packets that have a specified port number. The CPU 1 is programmed to provide the singular function of capturing UDP data packets having the designated port number and storing those captured data packets in the memory 152.

While the CPU 1 is programmed with native code to perform the function of capturing and storing UDP data packets, a second processor (e.g., the CPU 2) is also programmed with native code to perform the function of retrieving the stored data packets and playing them on the display 154. In addition, if the captured video stream is a multimedia stream, the CPU 2 also provides audio data to the audio output device 158.

In one embodiment, the CPU 1 stores the UDP data packets for a short time and then closes the file in which the received data packets are stored. This permits a second processor, the CPU 2, to open the file and play back the received data packets on the display 154. In this embodiment, the CPU 1 saves the received UDP data packets as a series of files that are closed after a short period of time while the CPU 2 opens the closed files and plays the received UDP packets on the display. If the received data packets are multimedia data packets, the CPU 2 also sends data to the audio output device 158.

In an alternative embodiment, the operation of the CPU 1 and CPU 2 is tightly integrated so that both the CPU 1 and the CPU 2 can access the same file in the memory 152. In this embodiment, there is only a single data file with the CPU 1 placing received data packets in the data file in the memory 152 while the CPU 2 retrieves and plays the data packets from the single data file in the memory 152 on the display 154 and the audio output device 158 if the video stream is a multimedia file.

The efficient native code programming of the CPU 1 and CPU 2 allows the UE 110 to effectively capture and play back a video data stream. In the UE 110, the CPU 1 is programmed for the singular function of capturing and storing UDP data packets while the CPU 2 is programmed for the singular function of retrieving and playing the stored UDP data packets. The tight operation of the CPU 1 and CPU 2 permit the effective capture and play of UDP data packets at an acceptable frame rate to effectively provide streaming video or streaming multimedia to the UE 110 from the APs 108 within a venue.

Figure 4:
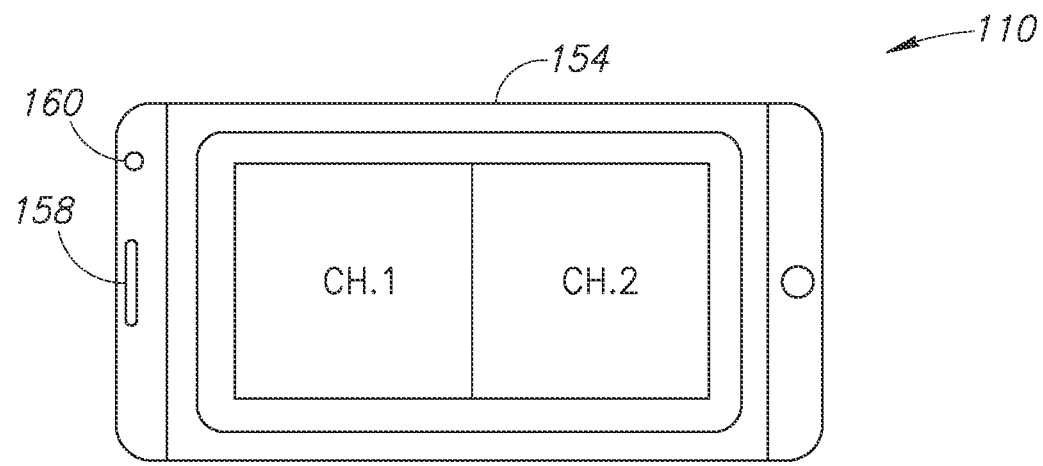
FIGS. 4-6 illustrate different video display configurations for a mobile communication device.

In an alternative embodiment, CPU 1 and CPU 2, or additional ones of the CPUs 150, can be programmed to receive and process UDP data packets with multiple different port numbers, thus enabling the UE 110 to receive multiple channels simultaneously. In this embodiment, the CPUs 150 may receive and decode multiple channels and show them side-by-side on the display 154 as illustrated in FIG. 4. Thus, the UE 110 may operate in a mode equivalent to split-screen television. The user can select which audio signal, if any, to process. While the UE 110 can process both audio signals, the simultaneous playing of two audio signals would create an unpleasant user experience.

Figure 5:
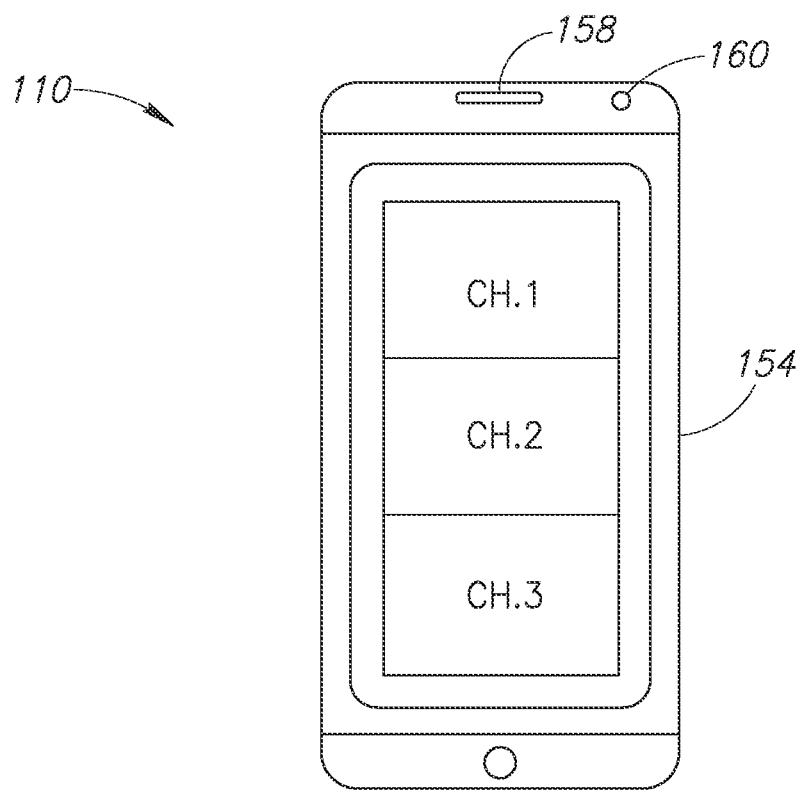

In yet another embodiment, the UE 110 can process additional video signals by detecting additional port numbers in the UDP packets associated with the desired channels. For example, FIG. 5 illustrates three channels shown on the display 154. Again, the user can determine which audio signal to process for play out on the output device 158.

Figure 6:
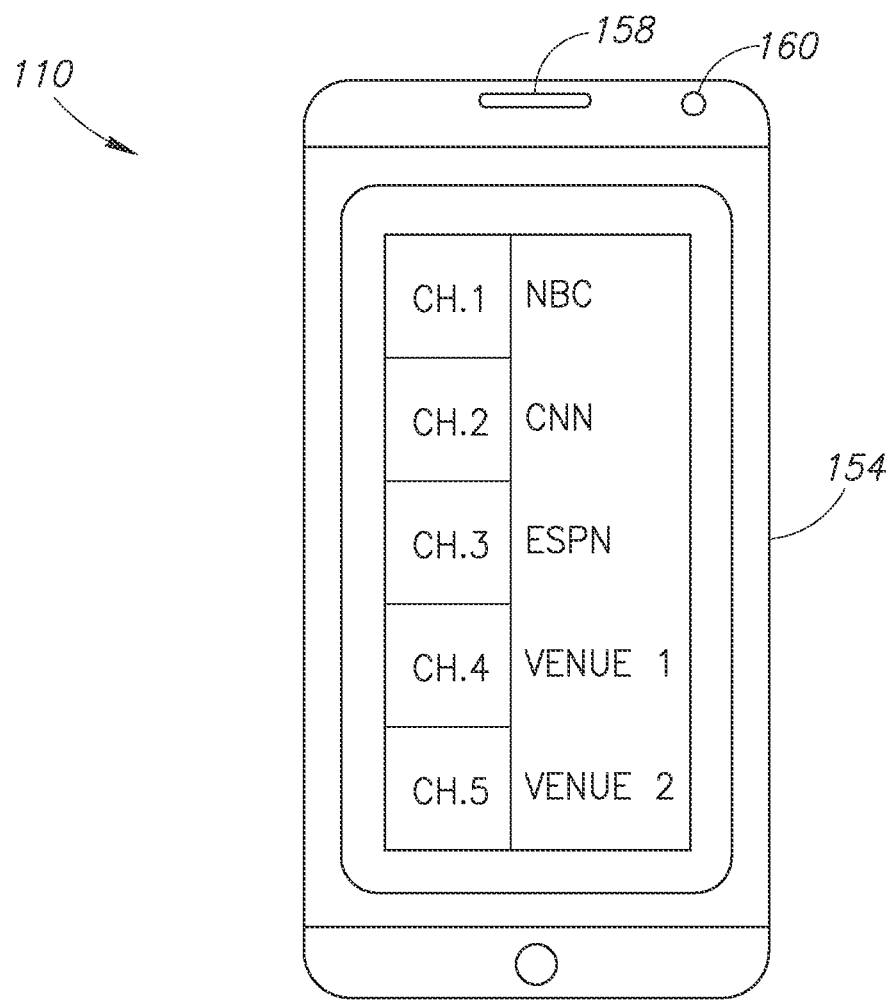

In yet another embodiment, the UE 110 can receive a plurality of channels and show the video from each of the channels as a thumbnail image, as illustrated in FIG. 6. In FIG. 6, the thumbnail video image from channels 1-5 may be shown on one portion of the display 154 and text data, such as labels, can provide the user with information related to each of the channels. The labels may include graphical information, such as logos, in addition to, or in place of, text data. Alternatively, the thumbnail images in FIG. 6 (or the images in FIGS. 4 and/or 5) may be still images, such as frames captured from the streaming video for the respective channels. That is, the images in the thumbnail displays in FIG. 6 may be captured frames from each of the respective channels to provide the user with a graphical indication of the content of each video channel. In yet another alternative, the frame rate may be reduced in the smaller images, such as the display of FIG. 6, to reduce the overall processing task for the 4 CPUs 150 (see FIG. 3). In this embodiment, the CPUs will display only a portion of the video frames for each channel.

Those skilled in the art will appreciate that the multi-channel screen displays in FIGS. 4-6 will be best displayed with a reduced resolution. That is, the resolution of channel Ch. 1 in FIG. 6 is significantly lower than the resolution of channel Ch. 1 in FIG. 5 which, in turn, has a lower resolution than channel Ch. 1 in FIG. 4. Image scaling to alter the resolution is well known in the art and need not be described in greater detail herein.

In the embodiments of FIG. 4-6, the display 154 may serve as a television guide to provide information to the user on the available channels and the content of those channels. As discussed above, the portion of the display labeled Ch. 1-Ch. 5 in FIG. 6 may contain thumbnail video images, still images, or reduced frame rate video from the respective channels. The graphical and/or text information provides greater detail to the user. In this embodiment, the user may select a single channel for a full screen display simply by touching on the appropriate portion of the display 154. For example, the user may tap on the display 154 proximate the video display for any of channels Ch. 1-Ch. 3 to view commercial television broadcasts. Alternatively, the user may tap on channel Ch. 4 or Ch. 5 to select video images from within a particular venue at which the UE 110 is present, or from a venue remote from the current location of the UE.

Figure 7:
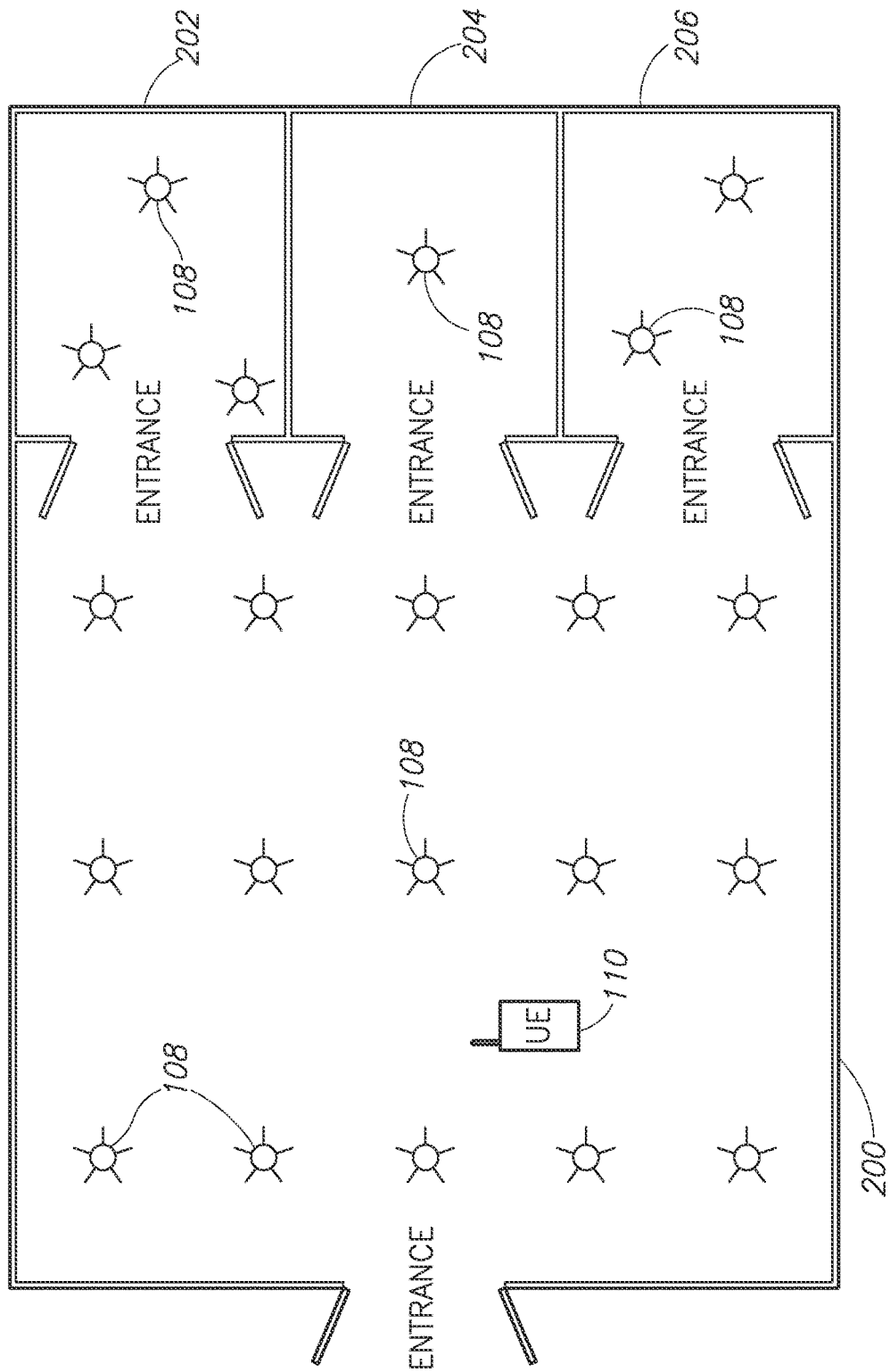
FIG. 7 illustrates a venue with a large number of distributed wireless access points.

FIG. 7 illustrates a large venue 200, in which a network of APs 108 has been deployed. The position and coverage area of the APs 108 can be determined based on the particular hardware implementation. The actual distribution and installation of the APs 108 using the infrastructure 106 (see FIG. 1) within the venue 200 is within the engineering knowledge of one skilled in the art and need not be described in greater detail herein.

In the embodiment of FIG. 7, all of the APs 108 are coupled to the video server 104 in FIG. 1. As the UE 110 moves throughout the venue 200, it is making and breaking wireless communication devices with one or more of the APs 108. Thus, the UE 110 can receive a selected streaming video channel anywhere within the venue 200.

The identity of the UE 110 can be verified by the UE providing a profile and user information and signing up for the WiFi service and downloading the API. Initially this may be accomplished through a portal page, as will be described in greater detail below.

Once the identity of the UE 110 has been verified, the video server 104 can provide a selection of available video streams. For example, a selection of available video streams may be shown on the display 154, which may also be a touch-sensitive display. In a typical embodiment, illustrated in FIG. 6, there is a short description of the video stream along with the video thumbnail image shown on the display 154. The user simply taps the display 154 near the description or the video image of the desired video stream. The port number associated with the selected video stream is supplied to the CPU 1 to begin the video streaming process. In an exemplary embodiment, the CPU 1 and CPU 2 may use progressive downloading so that a short segment of the video stream is captured by the CPU 1 before the CPU 2 begins the play-out process. This allows a smoother transition to video streaming and avoids any initial buffer starvation.

The venue 200 of FIG. 7 is illustrative of a broad range of embodiments of the system 100. In one embodiment, the venue 200 may be a casino venue and the venues 202-206 are related venues, such as a performance venue 202, a nightclub venue 204, or a restaurant venue 206, all housed within the casino venue 200. In another example, the venue 200 may be a large outdoor venue, such as a music festival. In this example, the venues 202-206 may represent difference musical stages within the venue. Although FIG. 7 illustrates the venues 202-206 as adjacent to each other within the venue 200, those skilled in the art will appreciate that there is no technical requirement that these venues be physically adjacent.

In yet another example, the venue 200 may represent a film festival venue and the related venues 202-206 may represent Individual theaters participating in the film festival. Those skilled in the art will appreciate that, in this embodiment, the venue 200 may encompass a portion of a city or even the entirety of a large town, such as the Sun Dance Film Festival in Park City, Utah.

In each of these embodiments, the network of APs 108 is distributed throughout the venue so that users may monitor activities throughout the venue, For example, in the music festival scenario, the user may monitor activity at each of the stage venues 202-206 continuously. In the film festival example, users may view trailers or other information from each of the theater venues 202-206. In the casino venue example, the user can receive advertising or other data from the related venues 202-206. In addition, the casino venue may provide other video streams, such as parimutuel events (i.e., horse races), sporting events (e.g., football, baseball, basketball, etc.), instructional videos, such as rules and/or tips on playing certain games within the casino, or the like. The user simply taps the display 154 near the desired video stream and the video streaming will begin. While the UE 110 remains within the venue 200, it is in substantially continuous contact with the APs 108 and may receive data therefrom.

During a lull in activity in the video streaming, such as a timeout in the sporting event, the venue may provide its own advertising or other information to the UE 110. The ads may take the form of still images, videos similar to commercial television ads, or the like. The received videos can also have banner ads included or the video server 104 (see FIG. 1) can modify the video feeds to include advertising spliced into the video feed. This requires video processing equipment that is known in the art for this purpose. In yet another example, the video server 104 (see FIG. 1) may provide related information inserted into the video feed. For example, in the music festival venue 200, the video server 104 can provide the lyrics to songs currently being played at any of the stage venues 202-206. In this embodiment, the video server 104 can be configured to send the lyrics only to APs 108 in the vicinity of the particular stage venue. For example, all APs 108 within the venue 200 may provide video feeds from each of the stage venues 202-206. In one example, the lyrics for each of the stage venues may also be provided as part of the video feeds for each respective stage venue 202-206. Alternatively, the video server may transmit the video signals for all of the stage venues 202-206 to all APs 108 within the venue 200, but only transmit the song lyrics to the APs 108 located near each respective stage venue 202-206. In this manner, only UEs 110 proximate a particular stage venue (e.g., the stage venue 202) would receive the song lyrics. Those skilled in the art will appreciate that the lyrics may be provided as an overlay onto the video signal or shown as a form closed-captioning.

Furthermore, the heartbeat data, described above, can be used to provide a personal targeted advertising for an individual UE 110 as part of a streaming video on a particular channel. For example, in the casino venue example, the UE 110 could receive an ad for free or discounted tickets to the performance venue 202 or an invitation to happy hour at the nightclub venue 204 or a discounted meal at the restaurant venue 206. If the owner of a UE 110 is not a registered guest at a hotel within the venue 200, the APs 108 could send an invitation or ad to book a room in the venue 200. The UE 110 can communicate with the video server 104 or another server (not shown) within the venue 200 via the APs 108 to accept one or more of the ad offers. For example, the UE 110 could transmit an acceptance and book tickets at the performance venue 202. Similarly, the user of the UE 110 can book a room in the venue 200.

In the film festival venue example, the UE 110 may receive ads indicating the imminent start of a movie as the UE 110 passes by a particular theater venue (e.g., the theater venue 206). In this embodiment, advertisements may be sent only to the APs located near the particular theater venue so that the ads are more relevant to the current location of the UE 110.

In another embodiment, the venue 200 can provide channels for entertainment for special groups, such as children's television programs, children's videos, and the like.

Figure 8:
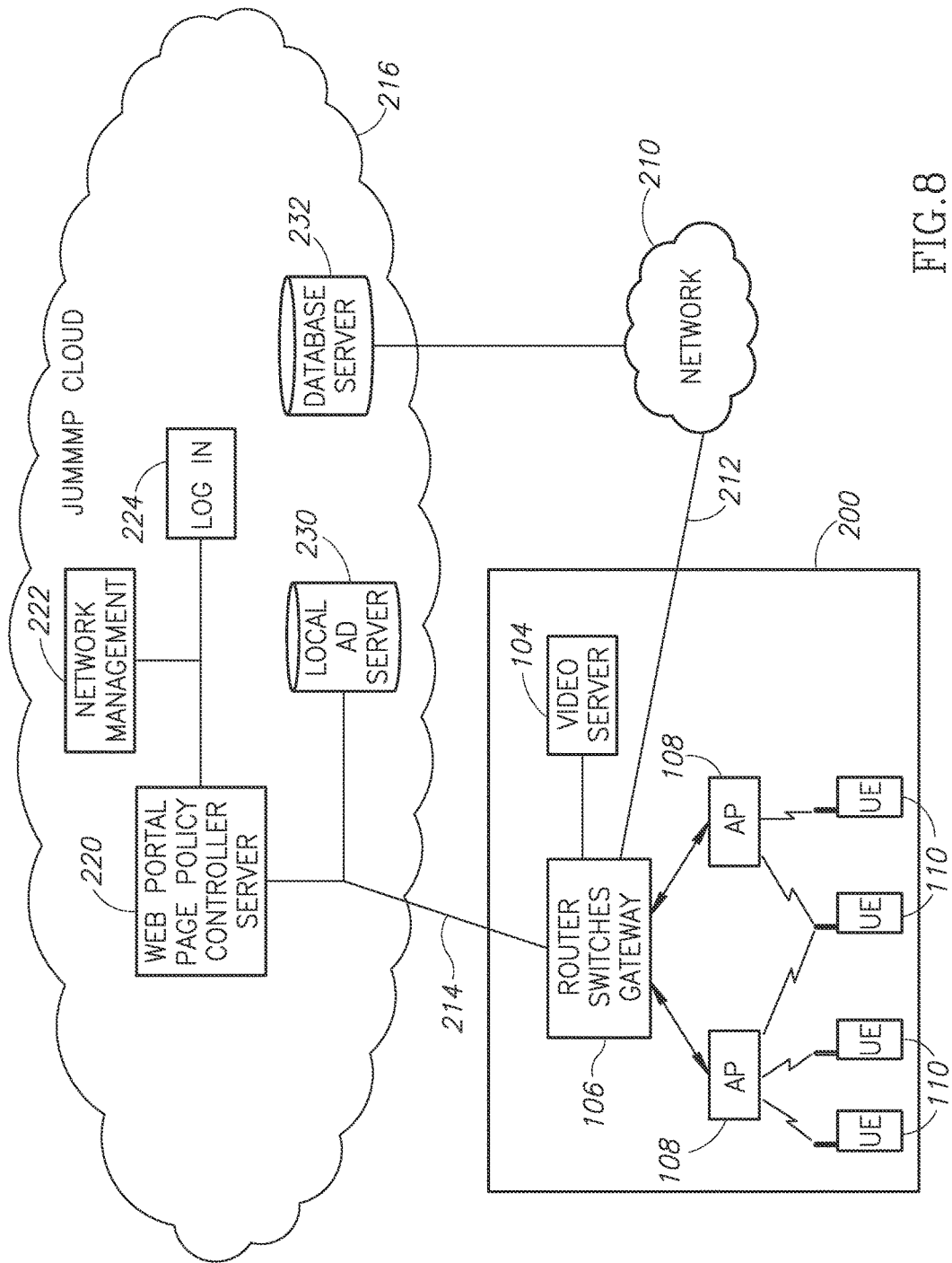
FIG. 8 illustrates a system architecture in which a venue communicates with a Cloud network.

FIG. 8 illustrates a system architecture that allows operation of the system 100 across multiple venues. As discussed above with respect to FIG. 7, the venue 200 may have a large number of APs 108 distributed throughout the venue. The various APs 108 are coupled together using the infrastructure 106. Among other things, the infrastructure allows an interconnection to a network 210 via a communication link 212. In a typical embodiment, the network 210 may be implemented as the Internet. In addition to the communication link 212, the infrastructure 106 provides a backhaul 214 to a cloud computing environment designated herein as a JUMMMP Cloud 216. The backhaul 214 may be implemented in a variety of different manners using known technology. In one embodiment, the backhaul 214 may be routed to the JUMMMP Cloud 216 via the network 210.

Within the JUMMMP Cloud 216 are a number of components. A web portal page and policy controller server 220 controls user authentication across a number of different venues in addition to the venue 200. A network management element 222 controls overall operation of the network in the JUMMMP Cloud 216 including registration and authentication services. FIG. 8 illustrates a log-in web page 224.

A local ad server 230 in the JUMMMP Cloud 216 may provide ads for the venue 200. As discussed above, the ads may be still images or streaming video and may be directed to the venue 200 itself or for the related businesses 202-206 (see FIG. 7). In addition, the ads may be for businesses near the venue 200 (or for other venues in the JUMMMP network). The centralized ad server 230 in the JUMMMP Cloud 216 simplifies the network architecture within the venue 200 and other venues by eliminating the need for an ad server within each venue.

A data base server 232 in the JUMMMP Cloud 216 may be configured to collect a broad range of information regarding the UEs 110 (including the user profile information stored in the memory 156 (see FIG. 3) of the UE that was provided when the UE was first identified in the venue. The profile information will help provide targeting marketing and advertising to the UE 110 as it traverses the venue. In addition, the profile information may be used to select the streaming videos that may be provided to the user. For example, if the user profile indicates that the owner of the UE 110 is an avid football fan, the selections of video streams may include multiple football games. In the music festival example of FIG. 7, the ads may be selected based on information provided directly by the user or derived from other sources, such as music playlist stored in the UE 110. From that playlist, it may be determined that the user has certain musical preferences and the ads can be tailored based on this information. As previously discussed, the heartbeat signal from the UE 110 may include geo-location data. The database server 232 is configured to store location information, along with time/date data to thereby track movements of the UE 110.

The UE 110 must register with the system 100 at some initial point in time. The initial registration can be performed remotely using, by way of example, a personal computer (not shown) connected to the JUMMMP Cloud 216 via the network 210. In another variation, the UE 110 can perform an initial registration as it enters the venue 200 illustrated in FIG. 8, as described above. When the UE 110 initially contacts one of the APs 108, the policy controller server 220 will not have any data related to the particular UE 110. In this case, that initial AP 108 in the venue 200 may perform an initial registration. For the initial registration, the UE 110 can connect to the initial AP 108 and provide identification information. In an exemplary embodiment, the user can complete the initial registration process by providing data, such as the telephone ID (i.e., the phone number), a device ID, a user ID, and an email address as well as other information, such as the user profile data stored in the memory 156 (see FIG. 3) of the UE 110. The user ID may be a user generated name, nickname, or the like. The device ID may vary based on the particular type of the UE 110. For example, if the UE 110 utilizes an Android™ operating system, the device can be assigned an Android™ ID. In addition, the UE 110 may typically be assigned an international mobile equipment identification (IMEI). Any of these device identifications alone may be transmitted to the registration server 222. In another alternative embodiment, a unique hash of one or more device IDs may be generated and transmitted to the registration server 222 as the device ID. The short-range transceiver 176 (see FIG. 3) may also include an identification, such as a MAC address that is unique to the UE 110. The registration data described above can be provided to the registration server 222 along with the MAC address. The registration data may be stored in association with the MAC address. Once the initial registration process has been completed, subsequent authentications are greatly simplified.

In one embodiment, a previously-registered UE 110 may come within range of the initial AP 108 in the venue 200 of FIG. 8 and establish a wireless communication link therewith. In establishing the communication link, the UE 110 automatically transmits its MAC address and/or the phone ID or IMEI. The AP 108 transmits an authentication request message to the registration server 222 to determine whether the UE 110 is a registered device. Based on the MAC address, the registration server 222 can confirm that the UE 110 has previously registered. Thus, the UE 110 is authenticated whenever it comes into range of an AP 108 of the system 100. This may occur transparently to the user. This automatic authentication process can occur even if the initial registration was in a completely different part of the country. Thus, the UE 110 may move from one venue 200 to another in the same city or region or may be in a completely different part of the country and be automatically identified and authenticated with APs 108 that are part of the system 100 described herein. This convenient registration and authentication avoids the need for constantly searching for a WiFi connection as required by other systems. Based on this automatic authentication process, the UE 110 may be automatically connected to the WiFi network created by the APs 108 in the venue 200.

The registration process at a single venue has been discussed above with respect to FIG. 8. The JUMMMP Cloud 216 also advantageously provides a centralized registration function for multiple venues, as illustrated in FIG.

Figure 9:
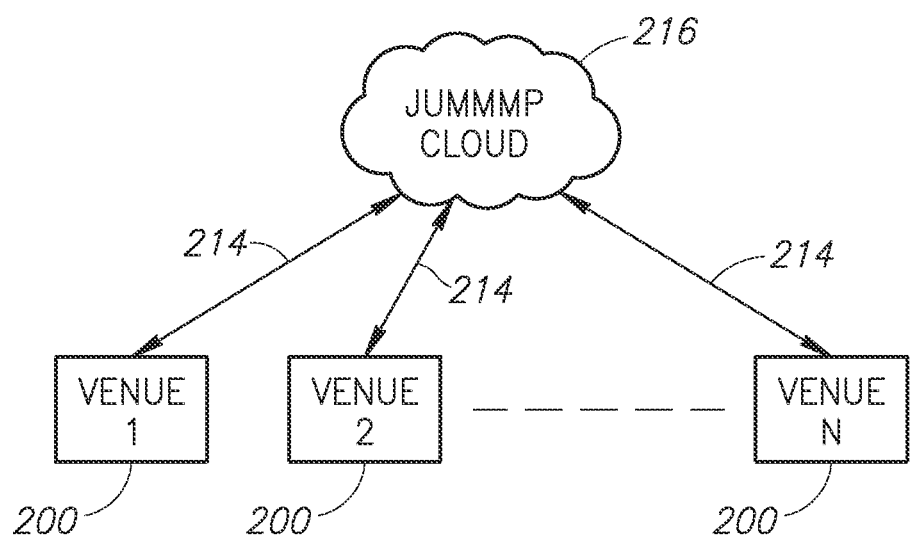
FIG. 9 illustrates the Cloud network of FIG. 8 communicating with multiple venues.

9. The multiple venues 200 are each connected to the JUMMMP Cloud 216 via individual respective backhauls 214. If a UE 110 initially registers at Venue 1, using the registration process described above, that registration information is stored in the JUMMMP Cloud 416. At a later point in time when the user enters, by way of example, Venue 2 illustrated in FIG. 9, the UE 110 will automatically identify the AP 108 and begin to communicate therewith. Because the UE 110 has already been registered, that information is passed along to the JUMMMP Cloud 216 and the UE is automatically authenticated. This is true even if the various venues 200 are located far from one another. For example, an initial registration of the UE 110 may take place at a sports venue in, by way of example, New York City. However, if the UE 110 is carried to a casino in, by way of example, Las Vegas, Nev., the UE 110 will automatically begin to communicate with the AP 108 in the new venue in Las Vegas. Because each venue is coupled to the JUMMMP Cloud 216, the UE 110 need not undergo another registration process when it enters the venue 200 in Las Vegas. Thus, a single registration process at any venue is sufficient for registration with the JUMMMP Cloud 216. Whenever the UE 110 goes into a different venue 200 that is coupled to the JUMMMP Cloud 216, the UE 110 is automatically recognized and authenticated.

Figure 10:
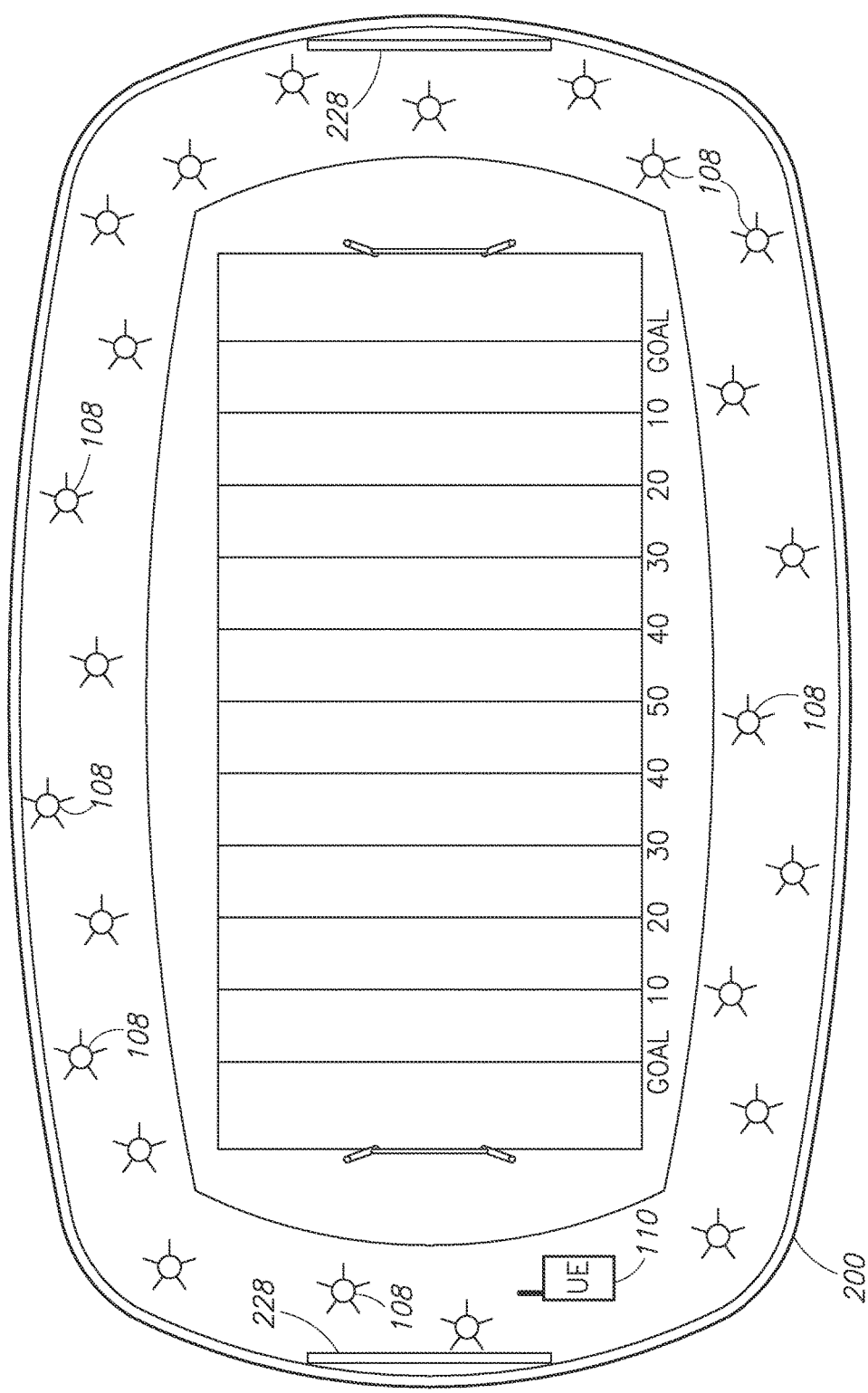
FIG. 10 illustrates a large array of wireless access points distributed throughout a sports venue.

In another example of a business-related implementation, the venue 200 may be a football stadium, as illustrated in FIG. 10, or some other sports venue. In this embodiment, the APs 108 are distributed throughout the structure of the sports venue. The UE 110 communicates with one or more of the APs 108 in the manner described above. The UE 110 can perform an initial registration process or an automatic authentication process, as described above. The APs 108 maintain virtually continuous contact with the UE 110 while it is within the sports venue 200. As discussed with respect to FIG. 8, the APs 108 are coupled to the infrastructure 106 to allow the distribution of multiple video channels to all of the UEs 110 within the sports venue 200. For example, one video channel can provide an overall view of the playing field while other video channels may provide different vantage points, such as close-up video streams of the line play, the quarterback, the receivers, and the like. Those skilled in the art will appreciate that a normal sports stadium, such as a football game, will have a number of different cameras used by network television to provide the various vantage points described above. In conventional operation, the feeds from those cameras are routed to a control center where an individual, such as the producer, selects a view for broadcast. However, at the centralized control center will receive all video feeds. These various video feeds may be provided to the video server 104 (see FIG. 1) for broadcast via the system 100 in the manner described above. Those skilled in the art will appreciate that other sports, such as basketball, hockey, baseball, and the like have a similar arrangement with cameras in various locations throughout the sports venue which video feeds are provided to a control center. As described above, the various video vantage points may be provided to the UE 110 for selection and viewing. In one embodiment, the system 100 can provide a list, similar to a television guide, as one of the available channels by encoding guide data in a series of data packets and providing each of those packets with a port number designated for such guide data. In this manner, the UE 110 can receive the guide data by selecting the channel number associated therewith. For example, the guide data May provide multiple channel views, as illustrated in FIG. 6, to assist the user in selecting the desired channel. The user may select which video stream to view on the UE 110 by selecting the appropriate channel. However, all of the video streams described above may be made available for selection by any of the UEs 110 within the venue 200. In addition, the JUMMMP Cloud 216 can disseminate information to the UEs 110 in the manner described above. The disseminated information may be in the form of advertisements from vendors within the venue 200, future availability of videos (e.g., upcoming sports events), and the like.

The JUMMMP Cloud 216 may also provide streaming video to the UE 110. For example, if the sports venue in FIG. 10 is a football stadium, the JUMMMP Cloud 216 may provide streaming video highlights or even complete games from a different football stadium that is also coupled to the JUMMMP Cloud 216. While some stadiums provide selected replays on a large screen TV or other display 228 for fans, such displays are not available if the user is away from the field to get a drink, go to the bathroom, etc. However, with the system described herein, the instant replay may be provided directly to the UE 110 at virtually any location throughout the sports venue 200. In this embodiment, the instant replay may be one of many channels that are multicast to all UEs 110 within the sports venue 200 by the multitude of APs 108. Alternatively, the system 100 can provide a video channel with a delay (e.g., 30 seconds) so that the UE 110 can always go back and review recent plays. Those skilled in the art will appreciate that the instant replay described herein is distinct from an "on-demand" form of instant replay. An on-demand system requires unicast delivery of the instant replay to each and every UE that transmits such a request. As discussed above, unicast delivery of video requires a unique communication link with each UE 110 and would quickly consume all available bandwidth in a typical AP 108. Accordingly, the instant replay described herein refers to video replay that is under control of the sender (e.g., the video server 104 in FIG. 1). The video server 104 selects the video that will be made available as a replay and transmits the replay video as a series of UDP packets with a separate port number, as described above. Thus, the instant replay is a multicast video stream available to all UEs 110 as a separate channel. The user can simply switch to the replay channel to view this video stream.

In one embodiment, the instant replay for the venue 200 (see FIG. 8) may be provided by the JUMMMP Cloud 216 to the video server 104 (see FIG. 1). In yet another embodiment, the video server 104 (see FIG. 1) receives a local feed of the streaming media or instant replay for activities within that local sports stadium. As described above, the sports venue 200 often has a control center that receives multiple video feeds from cameras at different vantage points throughout the sports venue. This centralized location of all video feeds makes it an ideal location to provide those video feeds to the video server 104 of the system 100. Furthermore, the venue 200 may provide streaming television channels that would allow a UE 110 to view broadcast television channels, local streaming video, or remote streaming video, as illustrated in the example of FIG. 6.

Figure 11:
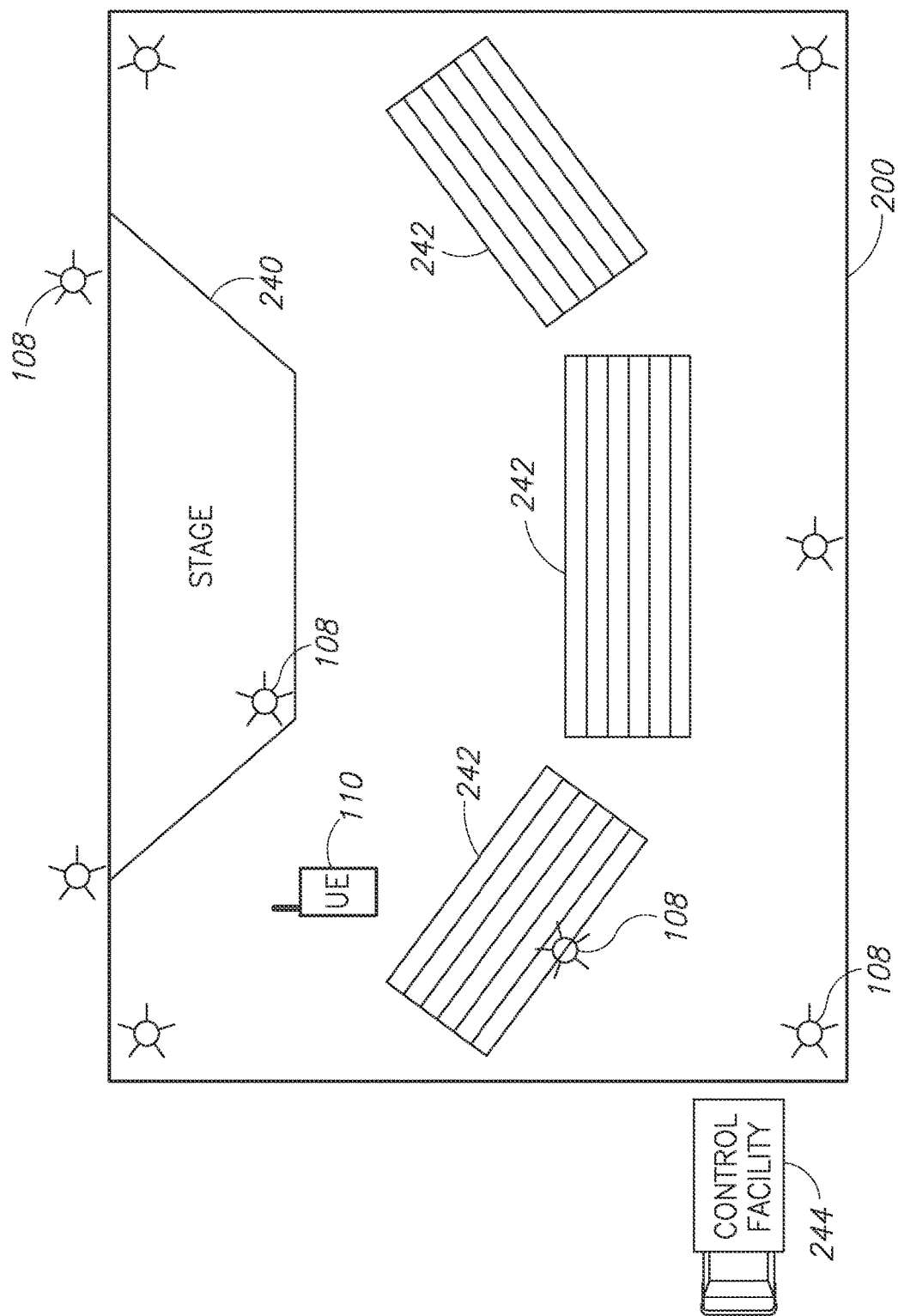
FIG. 11 illustrates an array of wireless access points distributed throughout a concert venue.
Figure 12:
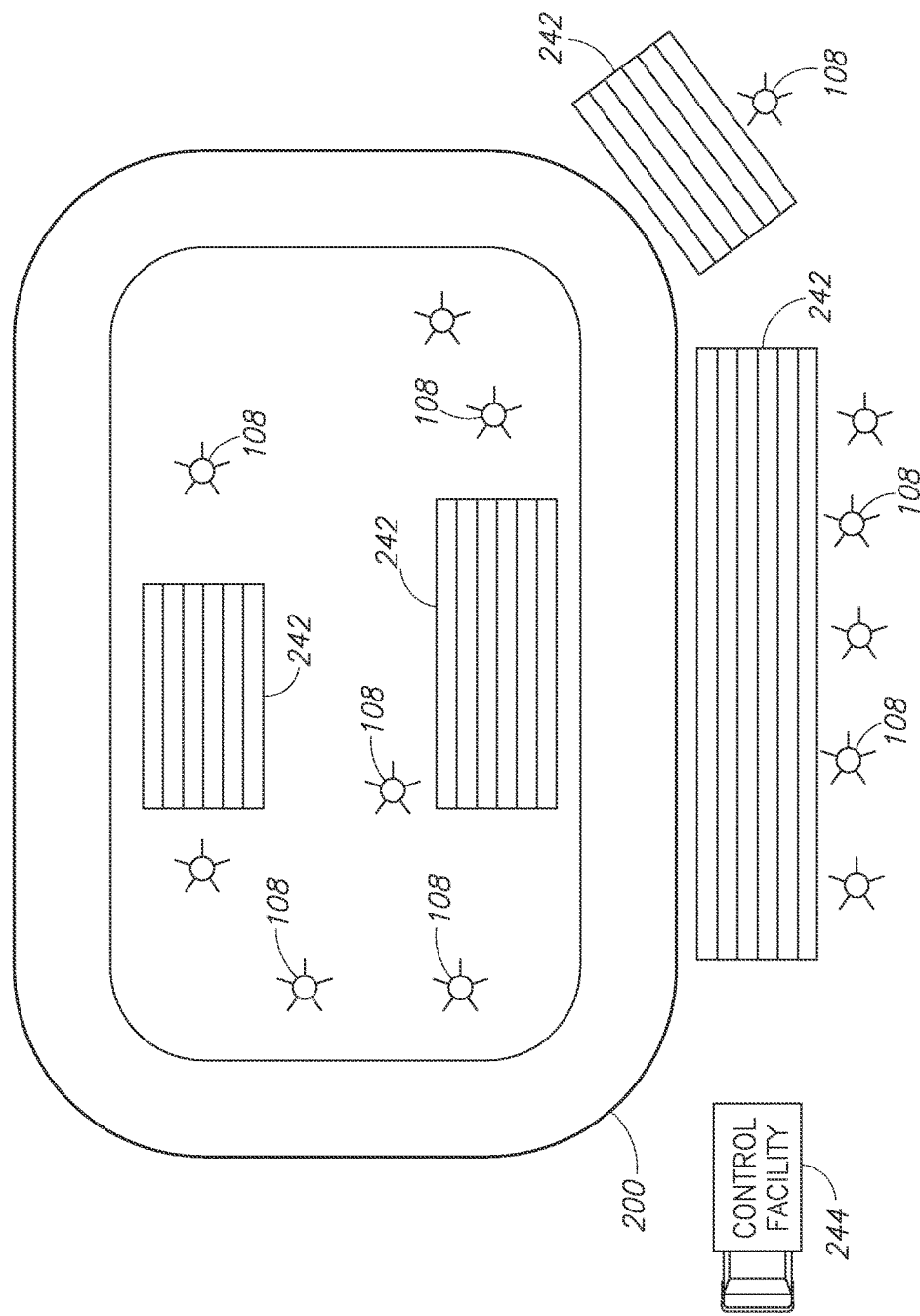
FIG. 12 illustrates an example implementation of the system 100 at a race track venue.
Figure 13:
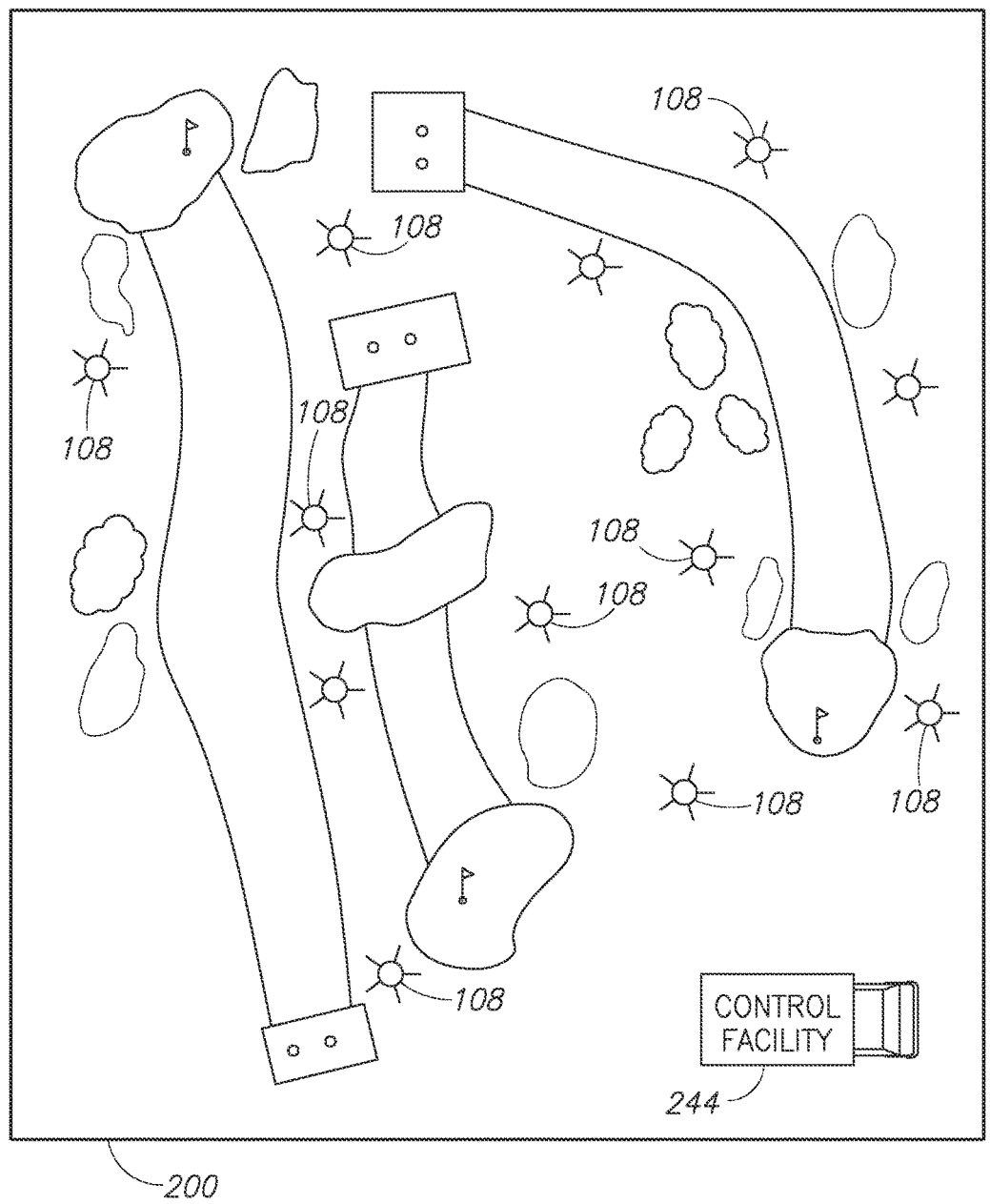
FIG. 13 illustrates an example implementation of the system 100 at a golf course.

In the examples provided above, the APs 108 are in fixed locations throughout the venue 200 to maximize coverage throughout the venue. This is true whether the venue 200 is a fixed facility, such as the casino venue or sports venue. However, the system described herein is flexible enough to provide temporary coverage in a venue that does not have preexisting coverage. For example, a concert hall may not have existing coverage through a network of APs as described above. For example, a concert venue at the state fair may be temporary in nature. Similarly, a concert venue may be constructed temporarily at an open air location (e.g., a multi-stage music festival, Woodstock, a sports stadium, or a speedway). In yet another example, some venues, such as a racetrack (see FIG. 12) or a golf course (see FIG. 3), may not have an existing infrastructure of APs 108. In yet another example embodiment, the system described herein can provide a temporary mobile venue infrastructure, which may be referred to herein as "WiFi on Wheels" (WoW). Examples of a WoW implementation are illustrated in FIGS. 11-13. The example of FIG. 11 is a temporary concert venue, such as may be common at a state fair or other location. A stage 240 and grandstands 242 may be positioned within the venue 200. The location of the APs 108 throughout the venue 200 may be dependent on the location of the stage 240 and the grandstands 242 to provide the necessary coverage. In this embodiment, the APs 108 may be mounted on existing infrastructure, such as telephone poles, light poles, and the like. The APs 108 may also be mounted directly to the stage 240 or the grandstand 242. A control truck or other mobile control facility 244 contains the additional infrastructure for the temporary concert venue 200. For example, the control facility 244 may contain the video server 104 and infrastructure 106 (see FIG. 1) to provide the necessary connection to the JUMMMP Cloud 216. The control facility 244 may also include a satellite link to implement the backhaul 214. The backhaul 214 can also be implemented as a microwave link from the control facility 244 or a hardwired connection if available. Thus, the WoW implementation of FIG. 11 can be set up and removed in a relatively short period of time.

In operation, the concert venue 200 operates in the same manner described above with respect to other venues. That is, the UE 110 is automatically authenticated if the UE 110 has previously authenticated with the JUMMMP Cloud 216. If the UE 110 has never been registered with the JUMMMP Cloud 216, the UE undergoes an initial registration process described above with respect to FIG. 8. Thus, the temporary concert venue 200 operates in a functionally identical manner to the fixed venues described above. For example, the concert venue 200 in FIG. 11 may offer multiple video channels from various vantage points, such as an overall view of the concert stage, close-ups of the concert stage, close-ups of individual performers on the stage, or the like. The user can simply select the desired streaming video channel from the available selection shown on the display 154 (see FIG. 3). In addition, as described above, the venue 200 may provide video advertisements on the selected channel.

In addition to the streaming media channels, the video server 104 (see FIG. 1) can add additional data packets, or modify existing data packets, for particular channels. For example, the video server 104 can provide an overlay of the video signal to provide lyrics to a song currently being performed on the stage 240. While functionally similar to close-captioning in conventional television, those skilled in the art will appreciate that closed-captioning takes advantage of certain available space in the spectrum of a television signal in which to insert additional data. In the present case, the video server 104 processes the video packets to include the video overlays. In addition to overlays, such as song lyrics, the video server 104 can include ads or other information to be shown on a selected portion of the display 154 (see FIG. 3). In ne embodiment, the ads can be related to the particular venue or event. For example, the display 154 may include ads for free Music downloads, sales of T-shirts or other memorabilia, music CDs, DVDs, or the like related to the particular performer.

In an alternative embodiment, the video server 104 (see FIG. 1) can send command data to all APs 108 within the venue 200 or to selected APs within the venue to force the UEs 110 to change port numbers for processing by the CPU1 (see FIG. 3). This effectively causes the UE 110 to "change channels." That is, the UE 110 receives a data command and changes the port number for the received UDP data packets. As described above, the CPU1 will identify and save all UDP data packets having a selected port number. In this instance, the initial port number is altered via a data command from the video server 104.

For example, in the sports venue 200 illustrated in FIG. 10, it may be possible to cause some or all of the UEs 110 to change channels and receive a commercial during a time out. After the commercial, or when the time out ends, the individual UEs 110 can automatically revert back to the original channel by reinstating the initial port number used by the CPU1. Alternatively, the UEs 110 can switch back to the initial port number upon receipt of an additional data command from the video server 104.

Examples of the multiple video channels in a venue have been provided for a casino, a football stadium, and a concert venue. However, those skilled in the art will appreciate that the principles of the system 100 can be readily extended to other settings. For example, a race track venue 200 (i.e., an auto race track or a horse race track) (illustrated in FIG. 12) can provide streaming video to the UEs 110 from different vantage points throughout the race track. FIG. 12 illustrates grandstands 242 and a plurality of APs 108 distributed throughout the race track venue 200. Those skilled in the art will appreciate that the distribution of the APs 108 is designed to provide coverage throughout the race track venue 200. Television cameras positioned throughout the race track venue 200 provide video feeds to the control facility 244. As discussed above, this is a convenient location from which to provide video feeds to the video server 104. For example, in the case of automobile racing, it is possible to have one or more video channels directed to the pit area, video channels for different turns or portions of the race track, video channels that focus on individual race leaders or fan favorites, in-car video, and the like. The UE 110 can simply select which streaming video or videos to receive by selecting the appropriate channels in the manner described above. In addition, the user can readily change channels at the push of a button.

In addition to the streaming video and data made available to the public via the APs 108, the system 100 can provide private or secure communications for authorized UEs 110 operated by participants. To provide secure information, the data frames may be encrypted prior to transmission to thereby prevent unauthorized access. Alternatively, secure data may be assigned port numbers that can only be used by authorized UEs 110.

For example, the race track venue 200 can provide video and data services for the participants. In addition to the video streams made available to the public via the APs 108, each race team may have additional video and/or data for use only by the individual teams. For example, communication between the race car driver and the pit crew may include voice communications, vehicle performance data, and the like. In-car video may be uploaded from the vehicle to one or more of the APs 108 as the vehicle traverses the race track and provided to the individual teams.

Similarly, in the sports arena example of FIG. 10, the system 100 can provide secure video and data for each of the teams. This can include voice communications between coaches in the press box and team members on the field. In another example, the system 100 can provide information to authorized UEs 110 operated by medical teams on the sidelines. For example, if a player is injured on the field, the medical team may use the system 100 to provide the team physician with medical data related to the injured individual. Furthermore, communications between the team physician attending the injured player on the field and medical personnel on the sidelines can be readily accomplished via the system 100. In this embodiment, voice communications, video data uploads, and the like may be encrypted or otherwise secured prior to transmission from the authorized UE 110 on the field to one or more of the APs 108. This data may be intended for sideline medical personnel or relayed to a nearby hospital. Those skilled in the art will appreciate that such information is confidential and should not be publically broadcast via the APs 108. The system 100 provides secure communications capabilities for this type of data. In other words, the system 100 can provide streaming video available to the public on a non-secure basis, as well as confidential communications that may be transmitted to authorized UEs 110 in a secure fashion.

In another example, APs 108 may be distributed around a golf course venue 200, illustrated in FIG. 13, during a golf tournament. Because a golf tournament generally lasts only a few days, the temporary installation described above with respect to the concert venue of FIG. 11 may be applicable here as well. That is, APs 108 may be temporarily distributed throughout the golf course venue 200 and coupled to the control facility 244 or other control installation. In this embodiment, the video server 104 (see FIG. 1) is typically installed within the control facility 244. In this example, various video streams could be provided for different holes on the golf course, video of individual players, such as the current leaders, fan favorites or the like. Again, the UE 110 simply selects the desired video stream from among the available selections by activating a selected channel on the display 154 (see FIG. 3).

Figure 14:
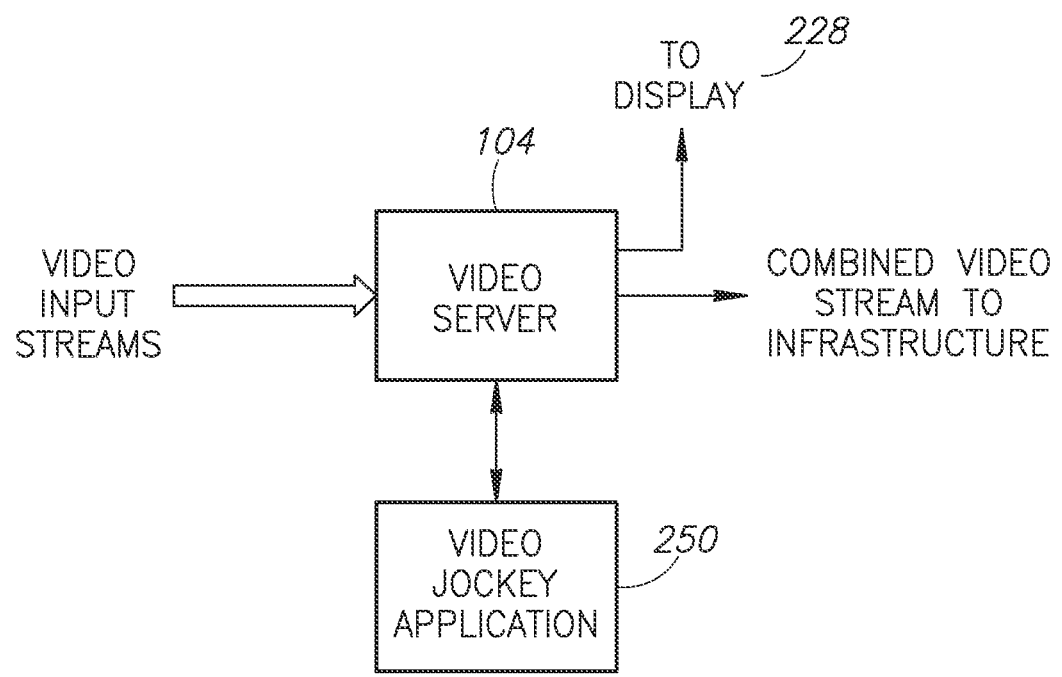
FIG. 14 is a functional block diagram illustrating operation of a video server.

FIG. 14 illustrates further operational control of the video server 104. In one embodiment, a conventional video control console can be used to control the video input streams from the video sources 102 (see FIG. 1). Alternatively, an application program, such as a "video jockey" (VJ) application 250 can be used to control operation of the video server 104. For example, in the sports stadium venue 200 of FIG. 10, the video server may receive a number of different video feeds from various vantage points throughout the stadium. The VJ application 250 can preview the video feeds and select which video feeds for combination and transmission via the APs 108. In addition, the VJ application 250 can assign the port numbers for the individual video feeds. The VJ application 250 may also reassign a particular video feed associated with a particular port number. For example, the VJ application 250 may assign video 1 (see FIG. 1) to a particular port number at a first instance. At a point in time, the VJ application 250 may change to provide, by way of example, video 2 to that same port number. This effectively allows the VJ application 250 to change the particular video feed that will be provided to the UEs 110 a given channel. For example, the VJ application 250 may be used to switch to a different video feed during a time-out, or during an intermission, such as half-time. Thus, the VJ application 250 has complete control over which video feeds are selected for inclusion in the combination video stream, which port numbers are assigned to each incoming video stream, as well as the ability to alter the port number associated with the video stream or to alter a video stream associated with a port number. As described above, the video server 104 will combine the video streams selected by the VJ application 250 into a single combined video stream where the data packets associated with each particular video feed are assigned a particular port number.

In addition, the VJ application 250 can construct the guide data illustrated in, by way of example, FIG. 6. That is, the selected video streams to be combined for the video server are also selected for inclusion in guide data. Under control of the VJ application 250, an operator may determine that the guide data will include still images, video images, graphics, text data, or combinations thereof.

In addition, the VJ application can select one or more video channels to show on a large stadium display 228 (see FIG. 10). These can include live videos from the local venue itself, replay videos, remote videos (e.g., from another game being Played elsewhere), or the like. While the video server combines data packets for transmission to the APs 108, the data provided to the display 228 may simply be in the form of a conventional video feed.

In addition to the video input 102 (see FIG. 1), the video server 104 can receive data uploaded by any of the UEs 110 within the venue 200. The uploaded data can include text data, audio data, still images, or video streams, or combinations thereof. For example, in the concert venue of FIG. 11, members of the audience can take pictures or record video of the concert from various vantage points in the concert venue 200 and upload the data to the video server 104 via one or more of the APs 108. The VJ application 250 can process this image data in a variety of fashions. In one example, the VJ application 250 can capture individual frames from a video stream, and combine them with other still image data uploaded from UEs 110 to create a photo montage that can be shown on the display 228 during the concert itself. The photo montage may also be provided to UEs 110 in the venue 200 by transmitting the photo montage as part of the single data stream from the APs 108 using a selected port number or provided on-line for downloading at a later time.

In another embodiment, the VJ application 250 can rebroadcast one or more video streams provided by the UEs 110. In this embodiment, the video server 104 receives the incoming videos uploaded from the UEs 110. The VJ application 250 can review the videos and select one or more for rebroadcast via the APs in the manner described above. That is, the VJ application 250 can assign one or more port numbers to one or more video streams uploaded by members of the audience and rebroadcast them on the infrastructure 106 and the APs 108, as described above. The UEs 110 can subsequently select a channel for viewing video images recorded by fellow audience members. Similarly, the video server 104 can transmit still images on a channel and switch from one image to the next at a selected time. The VJ application 250 can also transmit the uploaded video segments as a video montage. The video montage can be shown on the venue display 228 in which multiple uploaded video segments can be displayed individually or simultaneously on a split screen. In yet another alternative, the VJ application 250 can transmit the video montage to the UEs 110 as part of the UDP stream in the manner described above. Thus, the VJ application 250 can control operations by selecting the video streams, assigning channels, accepting uploaded image and video data from UEs 110, and saving or transmitting the uploaded image or video data to other users.

In yet another embodiment, the VJ application 250 may provide a list of uploaded videos as a variation on the guide data discussed above. In this embodiment, the operator may review and catalog uploaded images or video from the UEs 110 and make that data available to others of the UEs 110 in the form of guide data.

Figure 15:
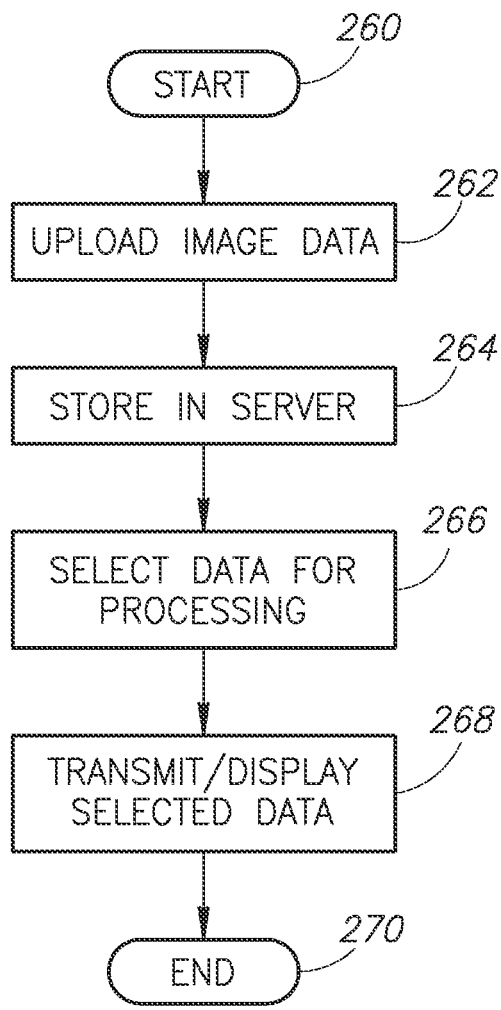
FIG. 15 is a flow chart describing an exemplary implementation of the video server of FIG. 14.

The operation of the video server 104 is outlined in the flow chart of FIG. 15 where, at a start 260, the system has been installed in the venue. This is true of a permanent installation or a temporary installation, such as illustrated in FIG. 13. In step 262, a UE 110 uploads image data via communication link with one or more of the APs 108. As noted above, the image data may be still images, video, or multimedia data. In step 264, the image data is stored in the video server 104. In step 266, the VJ application 250 (see FIG. 14) operates to select uploaded data for further processing. Further processing may include editing and selection of images for a photo montage, selection of images or videos for display on the large display 228 (see FIG. 10) at the venue 200, or processing for combination with other video input signals to form a continuous video stream for broadcast by the APs 108. In step 268, the video server 104 transmits or displays the selected data and the process ends at 270.

Although several example venues and applications have been discussed herein, those skilled in the art will appreciate that the system is not limited to these examples. Thus, the system described herein enables the delivery of a large number of video streams via a network of APs and allows each UE to select which channel to view.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for the broadcast of television channels to a plurality of mobile communication devices, comprising:
   a plurality of tuners each configured to receive a television channel and to generate an individual data stream corresponding to the respective television channel;
   a server coupled to the plurality of tuners and configured to receive the individual data streams from the plurality of tuners and to convert the individual data streams to a single stream of data packets with each of the plurality of data packets for respective ones of the individual data streams having a port number corresponding to the respective individual data stream;
   a plurality of wireless access points (APs) communicatively coupled to the server to receive the single stream of data packets therefrom, the APs being configured to transmit the single stream of data packets; and
   a routing infrastructure coupled to the server and the plurality of APs to relay communications between the server and the plurality of APs, the routing infrastructure being configured to route the single stream of data packets to selected ones of the plurality of APs wherein each of the plurality of mobile communication devices can receive any of the individual data streams by processing only data packets from the single stream of data packets that have the port number or numbers corresponding to user-selected one or more of the individual data streams and wherein the plurality of mobile communication devices do not transmit any channel selection data to any of the plurality of APs.

2. The system of claim 1 wherein the server is configured to convert the individual data streams to a single stream of User Datagram Protocol (UDP) data packets.

3. The system of claim 1 wherein the server is further configured to receive an additional data stream from a source other than the tuner array, the server being configured to convert the individual data streams from the tuner array and the additional data stream into the single stream of data packets.

4. The system of claim 1 wherein the server is further configured to select and assign an initial port number corresponding to each of the respective individual data streams.

5. The system of claim 4 wherein the server is further configured to alter the initially selected port number corresponding to one of the individual data streams wherein the one data stream has a port number different from the initially selected port number.

6. The system of claim 4 wherein the server is further configured to alter one of the individual data streams assigned to a particular port number.

7. The system of claim 1 wherein the server is further configured to generate guide data providing information about the content of each of the individual data streams and data corresponding to the port number for each of the individual data streams, and at least one of the plurality of APs is configured to transmit the guide data.

8. The system of claim 7 wherein the server is further configured to generate guide data as text data.

9. The system of claim 7 wherein the server is further configured to generate guide data as graphic data.

10. The system of claim 7 wherein the server is further configured to generate guide data as image data.

11. The system of claim 7 wherein the server is further configured to generate guide data as a plurality of images wherein each image is indicative of the content of a corresponding one of the individual data streams.

12. The system of claim 7 wherein the server is further configured to generate guide data as a plurality of video images wherein each video image is derived from a corresponding one of the individual data streams.

13. The system of claim 7 wherein the server is further configured to generate guide data as a series of data packets having a port number designed for the guide data and to combine the guide data packets into the single stream of data packets.

14. A method for the broadcast of television channels to a plurality of mobile communication devices, comprising:
receiving a plurality of television channels using a corresponding plurality of tuners, each of the plurality of tuners generating an individual data stream corresponding to a respective one of the plurality of television channels;
assigning a different port number to each of the individual data streams generated by the plurality of tuners;
converting each of the individual data streams generated by the plurality of tuners to a single stream of data packets with each of the data packets corresponding to the respective individual data streams including the port number assigned to the respective individual data streams generated by the plurality of tuners;
sending the single stream of data packets to a plurality of wireless access points (APs) for transmission as a single stream of data packets; and
each of the plurality of mobile communication devices receiving the single stream of video data packets and selecting any of the individual data streams generated by the plurality of tuners by processing the data packets having the port number corresponding to user-selected individual data stream without transmitting any channel selection data from the respective mobile communication device.

15. The method of claim 14 wherein any of the plurality of mobile communication devices can select multiple ones of the individual data streams generated by the plurality of tuners by processing the data packets having the port numbers corresponding to user-selected individual data streams.

16. The method of claim 14, further comprising:
receiving an additional data stream from a source other than the plurality of tuners, and
assigning a port number to the additional data stream that is different from any of the port numbers assigned to the individual data streams generated by the plurality of tuners;
wherein converting each of the individual data streams comprises converting the additional data stream in addition to the individual data streams generated by the plurality of tuners to a single stream of data packets.

17. The method of claim 14, further comprising generating guide data to provide information about the content of each of the individual data streams and data corresponding to the port number for each of the individual data streams.

18. The method of claim 17 wherein the guide data is generated as text data.

19. The method of claim 17 wherein the guide data is generated as graphic data.

20. The method of claim 17 wherein the guide data is generated as image data.

21. The method of claim 17 wherein the guide data is generated as a plurality of images wherein each image is indicative of the content of a corresponding one of the individual data streams.

22. The method of claim 17 wherein the guide data is generated as a reduced resolution video image derived from a corresponding one of the individual data streams.

23. A wireless access point (AP) for the broadcast of a plurality of video streams to a plurality of mobile communication devices, comprising:
an input connector configured to receive a radio frequency signal containing a plurality of television channels;
a plurality of tuners each coupled to the input connector and configured to receive one of the plurality of television channels and to generate an individual data stream corresponding to the television channel;
a processor configured to receive the individual video streams from the plurality of tuners and to combine the individual video streams into a single stream of video data packets with each of the video data packets in the single stream of video data packets having a port number corresponding to the respective individual video stream; and
a frequency transmitter configured to transmit the single stream of video data packets to the plurality of mobile communication devices to permit each of the plurality of mobile communication devices to select a television channel for viewing on the respective mobile communication device by processing only the video data packets in the single stream of video data packets having a user-selected port number corresponding to the user-selected television channel without transmitting any channel selection data from the respective mobile communication device.

24. The system of claim 23 wherein the processor is implemented as an application specific integrated circuit.

25. The system of claim 23 wherein the processor is implemented as a digital signal processor.

26. The system of claim 23 for use in a home wherein the input connector is a cable input connector and the plurality of mobile communication devices comprises computing tablets, televisions, and video recorders.

27. The system of claim 23 for use in a home wherein the input connector is coupled to a satellite receiver.

28. The system of claim 23, further comprising a receiver configured to receive communications from any of the mobile communication devices, the processor being further configured to receive a channel request from one of the mobile communication devices via the receiver, the processor generating a command to alter one of the plurality of tuners to thereby receive one of the plurality of television channels and to generate an individual data stream corresponding to the requested television channel.

29. A system for the broadcast of a plurality of video streams to a plurality of mobile communication devices, comprising:
a content provider server storing a plurality of data files, the serving being coupled to a wide-area network and configured to provide a video data stream using a unicast data protocol;
a local video processor coupled to the wide-area network and configured to receive the unicast data stream;
an input connector configured to receive a radio frequency signal containing a plurality of television channels;
a plurality of tuners each configured to receive one of the plurality of television channels and to generate an individual data stream corresponding to the television channel;
a processor coupled to the plurality of tuners and configured to receive the individual data streams from the plurality of tuners and the unicast data stream from the content provider server and to combine the individual video streams and the unicast data stream into a single stream of video data packets with each of the video data packets in the single stream of video data packets having a port number corresponding to the respective individual data stream and the unicast data stream; and
a radio frequency transmitter configured to transmit the single stream of video data packets to the plurality of mobile communication devices to permit a user of each of the plurality of mobile communication devices to select one of the individual video streams or the unicast data stream for viewing on the respective mobile communication device by processing only the video data packets in the single stream of video data packets having a user-selected port number corresponding to the user-selected one of the individual video streams or the unicast data stream without transmitting any channel selection data from the respective mobile communication device.

* * * * *